United States Patent
Lee et al.

(10) Patent No.: US 8,896,672 B2
(45) Date of Patent: Nov. 25, 2014

(54) IMAGE DISPLAY DEVICE CAPABLE OF THREE-DIMENSIONALLY DISPLAYING AN ITEM OR USER INTERFACE AND A METHOD FOR OPERATING THE SAME

(75) Inventors: Jaehak Lee, Seoul (KR); Youngsun Joo, Seoul (KR); Jaekyung Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 474 days.

(21) Appl. No.: 12/952,937

(22) Filed: Nov. 23, 2010

(65) Prior Publication Data

US 2011/0122235 A1    May 26, 2011

(51) Int. Cl.
*H04N 13/04* (2006.01)
*H04N 13/00* (2006.01)

(52) U.S. Cl.
CPC ........ *H04N 13/0452* (2013.01); *H04N 13/0456* (2013.01); *H04N 13/0497* (2013.01); *H04N 13/0029* (2013.01); *H04N 13/0022* (2013.01)
USPC ............. 348/51; 345/419; 345/422; 345/427; 348/42; 348/43; 348/565; 382/154; 386/241; 386/248; 386/341; 386/357; 715/810; 715/848; 715/850; 725/41; 725/55; 725/56

(58) Field of Classification Search
CPC . H04N 13/04; H04N 13/007; H04N 13/0055; H04N 13/0066; H04N 13/0048; H04N 13/0497
USPC ............................................ 348/51; 717/105
See application file for complete search history.

(56) References Cited

U.S. PATENT DOCUMENTS

| | | | |
|---|---|---|---|
| 2003/0177495 A1* | 9/2003 | Needham et al. | 725/55 |
| 2004/0236507 A1 | 11/2004 | Maruyama et al. | |
| 2004/0239763 A1* | 12/2004 | Notea et al. | 348/169 |
| 2005/0254702 A1 | 11/2005 | Era | |
| 2006/0253802 A1 | 11/2006 | Kim | |
| 2007/0097113 A1 | 5/2007 | Lee et al. | |
| 2008/0092110 A1* | 4/2008 | Kawahara et al. | 717/105 |
| 2009/0142041 A1* | 6/2009 | Nagasawa et al. | 386/124 |
| 2010/0045780 A1* | 2/2010 | Kwon et al. | 348/51 |
| 2010/0074594 A1* | 3/2010 | Nakamura et al. | 386/92 |

(Continued)

FOREIGN PATENT DOCUMENTS

| | | |
|---|---|---|
| CN | 1496183 A | 5/2004 |
| CN | 1893673 A | 1/2007 |

(Continued)

*Primary Examiner* — Jay Au Patel
*Assistant Examiner* — Neil Mikeska
(74) *Attorney, Agent, or Firm* — Birch, Stewart, Kolasch & Birch, LLP

(57) ABSTRACT

An image display device for displaying a 3-Dimensional (3D) image and a method for operating the same are disclosed. The image display device includes a user input unit configured to receive an item selection signal for some of one or more items included in a User Interface (UI) image, a control unit configured to generate a detailed image of a selection item selected by the item selection signal as a 3D image, and a display unit configured to display the detailed image. A user can select and receives an UI image or items included therein as a 3D image, and select a 2D/3D mode of the displayed UI image so as to control a sense of depth thereof. If a plurality of UI images is displayed, the image display device can display UI images on multiple layers with senses of depth.

8 Claims, 24 Drawing Sheets

(56) References Cited

U.S. PATENT DOCUMENTS

2010/0083316 A1* 4/2010 Togashi et al. .................. 725/41
2010/0103318 A1* 4/2010 Wang et al. .................... 348/565
2011/0013890 A1* 1/2011 Sasaki et al. .................... 386/357
2011/0078634 A1* 3/2011 Klappert et al. ............... 715/850
2011/0119709 A1* 5/2011 Kim et al. ........................ 725/39
2012/0274635 A1* 11/2012 Guillou ........................... 345/419

FOREIGN PATENT DOCUMENTS

| | | |
|---|---|---|
| CN | 1952883 A | 4/2007 |
| EP | 1406163 A2 | 4/2004 |
| EP | 1739980 A1 | 1/2007 |
| WO | WO 01/61996 A1 | 8/2001 |

* cited by examiner

FIG. 4
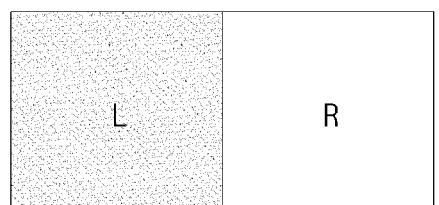
(a)
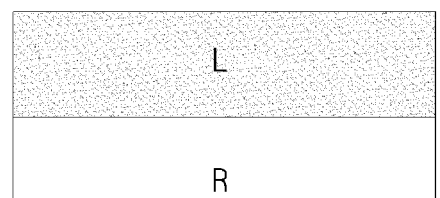
(b)
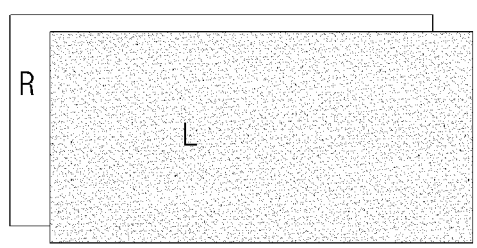
(c)
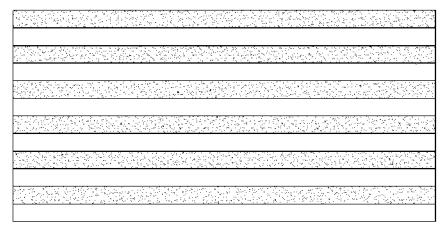
(d)
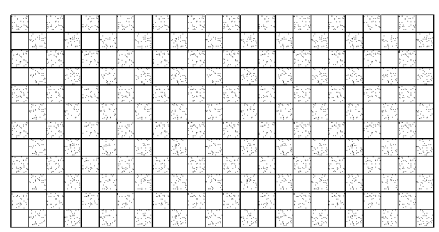
(e)

FIG. 5
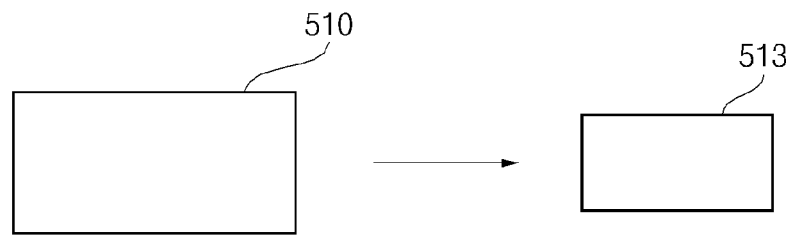
(a)
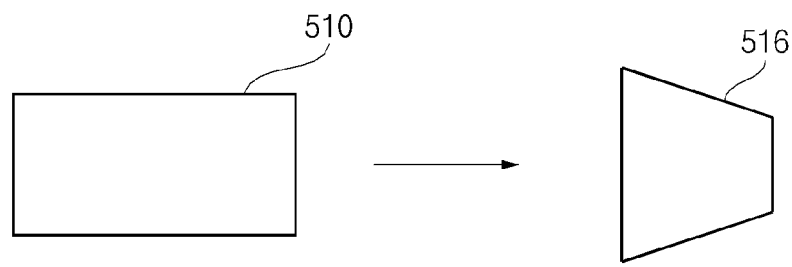
(b)
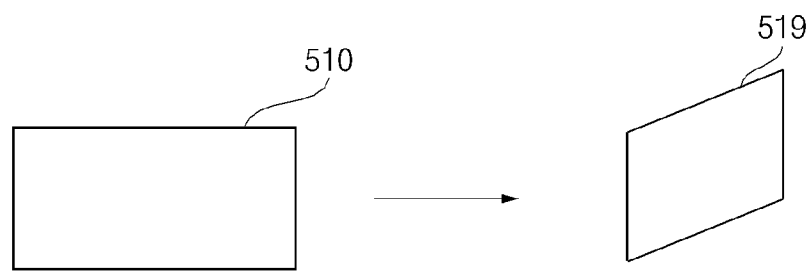
(c)

2500

IMAGE DISPLAY DEVICE CAPABLE OF THREE-DIMENSIONALLY DISPLAYING AN ITEM OR USER INTERFACE AND A METHOD FOR OPERATING THE SAME

CROSS-REFERENCE TO RELATED APPLICATION

This application claims the priority benefit of Korean Patent Application No. 10-2009-0114105, filed on Nov. 24, 2009 in the Korean Intellectual Property Office, the disclosure of which is incorporated herein by reference.

BACKGROUND OF THE INVENTION

1. Field of the Invention

The present invention relates to an image display device for stereoscopically displaying an image and a method for operating the same, and more particularly to an image display device for adequately providing a User Interface (UI) according to content types and switching the provided UI and a method for operating the same.

2. Description of the Related Art

An image display device includes a function for displaying a viewable image to a user. The user can view a broadcast using the image display device. The image display device displays a broadcast, which is selected by the user from broadcast signals transmitted from a broadcast station, on a display. Currently, analog broadcasting is being phased out in favor of digital broadcasting.

A digital broadcast refers to a broadcast for transmitting digital video and audio signals. The digital broadcast has low data loss due to robustness against external noise, advantageous error correction and high-resolution, as compared with an analog broadcast. In addition, the digital broadcast can provide a bidirectional service unlike the analog broadcast.

Recently, research into stereoscopic images has been actively conducted. In addition, in various environments and technologies as well as the field of computer graphics, the stereoscopic image technology has become increasingly common and put to practical use. Even in the digital broadcast, the stereoscopic image can be transmitted, and a device for reproducing the stereoscopic image has been developed.

In particular, recently, attention on 3-dimensional (3D) content, which provides a three-dimensional effect and a sense of reality as compared with 2-dimensional (2D) content, has been increased and a large amount of 3D content has been produced.

However, if the image display device provides only a 2D User Interface (UI) and does not provide a 3D UI, the user may experience inconvenience in the use of the image display device, because only the 2D UI is provided even when the user views 3D content. In addition, accessibility and usability to the UI may be lowered. If 3D content is increased in the future, user inconvenience may increase.

SUMMARY OF THE INVENTION

Therefore, the present invention has been made in view of the above problems, and it is an object of the present invention to provide an image display device which is capable of three-dimensionally displaying a specific item or a specific User Interface (UI) when a user selects the specific item or the specific UI, and a method for operating the same.

It is another object of the present invention to provide a 2-dimensional UI with respect to 2-dimensional content, to provide a 3-dimensional UI with respect to 3-dimensional content, and to provide a switching function between 2-dimensional and 3-dimensional UI menus provided in advance.

It is another object of the present invention to provide an image display device which is capable of increasing/decreasing a sense of depth according to user control and adjusting the sense of depth according to a hierarchical relationship between items, if 3D content, a 3D UI, a 3D item, and a detailed image of the item are displayed.

In accordance with an aspect of the present invention, the above and other objects can be accomplished by the provision of an image display device for displaying a 3-dimensional (3D) image, the image display device including a user input unit configured to receive an item selection signal for some of one or more items included in a User Interface (UI) image, a control unit configured to generate a detailed image of a selection item selected by the item selection signal as a 3D image, and a display unit configured to display the detailed image In accordance with another aspect of the present invention, there is provided a method for operating an image display device for displaying a 3-dimensional (3D) image, the method including receiving an item selection signal for some of one or more items included in a User Interface (UI) image, generating a detailed image of a selection item selected by the item selection signal as a 3D image, and displaying the detailed image.

In accordance with another aspect of the present invention, there is provided an image display device for displaying a 3-dimensional (3D) image, the image display device including a display unit configured to display a high-level User Interface (UI) image including one or more low-level items, a user input unit configured to receive a user selection signal for the one or more low-level items, and a control unit configured to generate low-level UI images corresponding to the low-level items corresponding to the user selection signal, wherein the control unit generates the high-level UI image and the low-level UI images as 3D images having different senses of depth and the display unit displays the high-level UI image and the low-level UI images together.

In accordance with another aspect of the present invention, there is provided a method for operating an image display device for displaying a 3-dimensional (3D) image, the method including displaying a high-level User Interface (UI) image including one or more low-level items, receiving a user selection signal for the one or more low-level items, and displaying low-level UI images corresponding to the low-level items corresponding to the user selection signal, wherein the high-level UI image and the low-level UI images have different senses of depth.

According to the embodiments of the present invention, the image display device can provide a suitable 2D UI or 3D UI according to content types. In addition, the user can recognize the content type through the provided UI in advance.

In addition, the user can three-dimensionally receive only a UI selected by the user, an item included in the UI, or the detailed image of the item. Accordingly, the currently activated UI or item can become visually conspicuous and confusion with the other UIs can be prevented.

In addition, according to the embodiments of the present invention, the user can receive a 2D/3D UI according to various criteria such as importance of information or preference of the user, and accessibility and usability of the UI can be improved.

The image display device can switch a UI having the same content to a 2D UI or a 3D UI as necessary so as to change the format of the UI according to the viewing environment or the preference of the user. Thus, it is possible to provide convenience to the user.

BRIEF DESCRIPTION OF THE DRAWINGS

The above and other objects, features and other advantages of the present invention will be more clearly understood from the following detailed description taken in conjunction with the accompanying drawings, in which:

FIG. 4 is a diagram showing an example of a 3D image signal format for implementing a 3D image;

FIG. 5 is a diagram showing various scaling modes of the 3D image signal according to the embodiment of the present invention;

FIG. 18 is a diagram illustrating the case where a channel detailed information UI 950 is displayed as a 3D image and a tilt effect is applied;

DETAILED DESCRIPTION OF THE PREFERRED EMBODIMENTS

Exemplary embodiments of the present invention will be described with reference to the attached drawings.

The terms "module" and "unit" as used to describe components herein are used to aid in understanding of the components and thus should not be considered as having specific meanings or roles. Accordingly, the terms "module" and "unit" may be used interchangeably.

Figure 1:
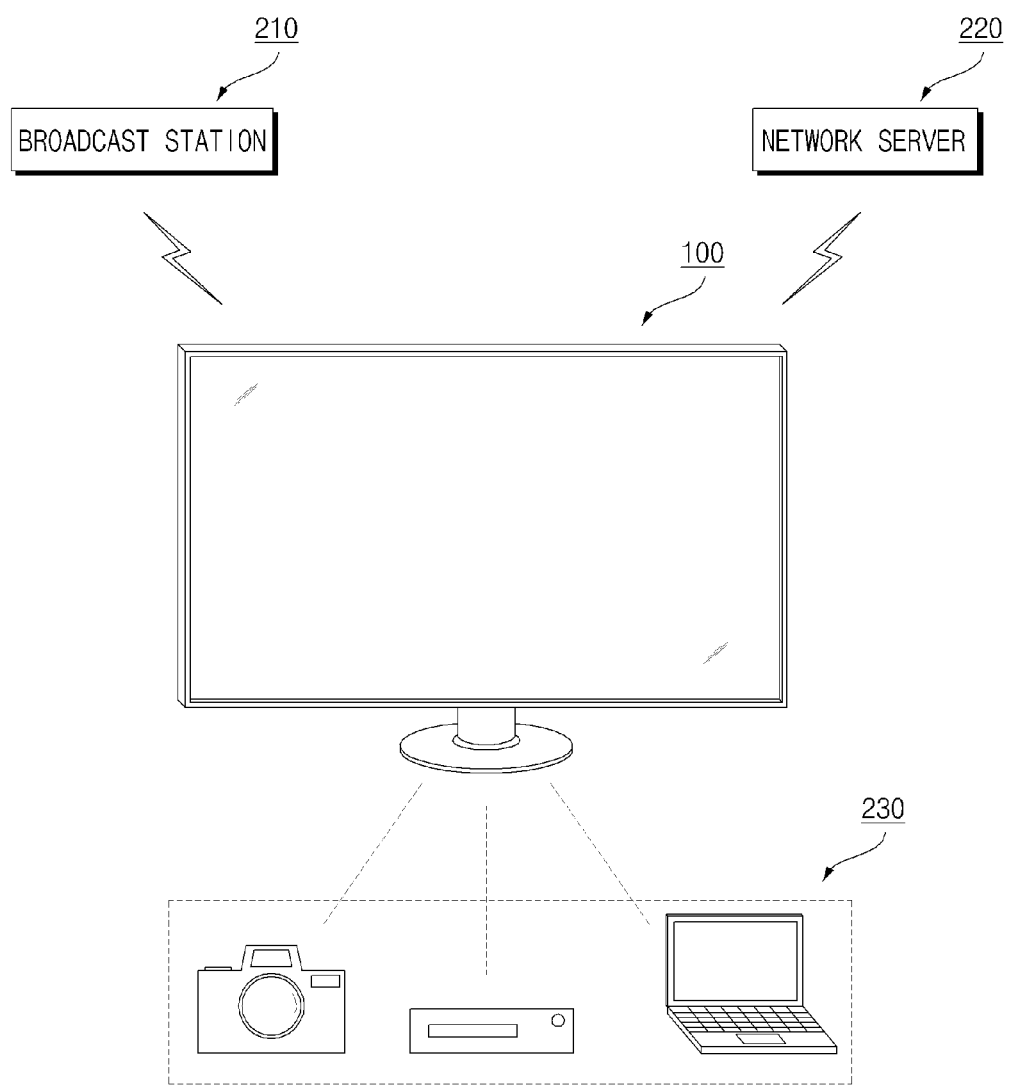
FIG. 1 a diagram showing an image display device system according to an embodiment of the present invention.

FIG. 1 a diagram showing an image display device system according to an embodiment of the present invention.

An image display device 100 according to the embodiment of the present invention includes a broadcast station 210, a network server 220 or an external device 230.

The image display device 100 may receive a broadcast signal including an image signal from the broadcast station 210. The image display device 100 may process a video signal and an audio signal or a data signal included in the broadcast signal so as to be suitably output by the image display device 100. The image display device 100 may output video or audio based on the processed video signal.

The image display device 100 may communicate with the network server 220. The network server 220 may transmit or receive a signal to or from the image display device 100 over a certain network. For example, the network server 220 may be a mobile phone which may be connected to the image display device 100 through a wired or wireless base station. In addition, the network server 220 may provide content to the image display device 100 over the Internet network. A content provider may provide content to the image display device 100 using the network server.

The image display device 100 may communicate with the external device 230. The external device 230 may directly transmit or receive a signal to or from the image display device 100 in a wired or wireless manner. For example, the external device 230 may be a media storage device or a reproduction device used by a user. That is, the external device 230 may be a camera, a Digital Versatile Disk (DVD), a Blu-ray player, a personal computer, or the like.

The broadcast station 210, the network server 220 and the external device 230 may transmit a signal including an image signal to the image display device 100. The image display device 100 may display an image based on the image signal included in the input signal. The image display device 100 may receive a signal from the broadcast station 210 or the network server 220 and transmit the signal to the external device 230 or receive a signal from the external device 230 and transmit the signal to the broadcast station 210 or the network server 220. That is, the image display device 100 may transmit content included in the signal transmitted from the broadcast station 210, the network server 220 and the external device 230, in addition to the reproduction of the content thereon.

Figure 2:
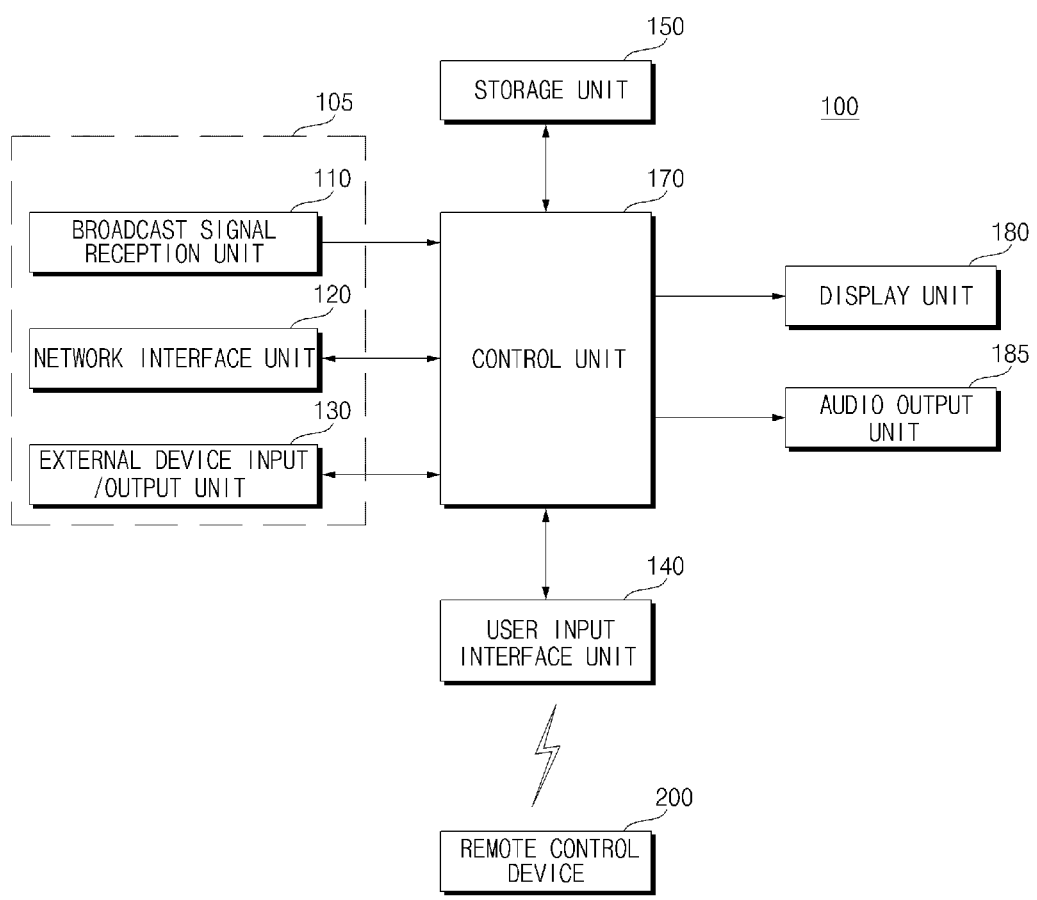
FIG. 2 is a block diagram showing the internal configuration of an image display device according to the embodiment of the present invention.

FIG. 2 is a block diagram showing the internal configuration of an image display device according to the embodiment of the present invention.

Referring to FIG. 2, the image display device 100 according to the embodiment of the present invention includes an image signal input unit 105, a user input interface unit 140, a storage unit 150, a control unit 170, a display unit 180, and an audio output unit 185. The image display device 100 can receive an image signal through the image signal input unit 105 and display an image. The image signal input unit 105 includes a broadcast signal reception unit 110, a network interface unit 120 and an external device input/output unit 130 according to a reception path of the image signal. The image signal input unit 105 receives an image signal corresponding to content to be reproduced on the image display device from an external device or various networks.

First, the broadcast signal reception unit 110 may receive a Radio Frequency (RF) broadcast signal corresponding to a channel selected by the user from RF broadcast signals received from the broadcast station (see 210 of FIG. 1) through an antenna or each of all channels stored in advance. The broadcast signal reception unit 110 may convert the received RF broadcast signal into an intermediate frequency signal or a baseband video or audio signal and output the intermediate frequency signal or the baseband video or audio signal to the control unit 170.

In addition, the broadcast signal reception unit 110 may receive an RF broadcast signal of a single carrier according to an Advanced Television System Committee (ATSC) system or an RF broadcast signal of multiple carriers according to a Digital Video Broadcasting (DVB) system. The broadcast signal reception unit 110 may sequentially select the RF broadcast signal of each of all the broadcast channels stored through a channel storage function among the received RF broadcast signals and convert the signals into intermediate frequency signals or baseband video or audio signals, in order to display a thumbnail list including a plurality of thumbnail images corresponding to the broadcast channels on the display unit 180. Accordingly, the broadcast signal reception unit 110 can sequentially/periodically receive the RF broadcast signals of all the selected channels or the channels stored in advance.

The network interface unit 120 provides an interface for connecting the image display device 100 to a wired/wireless network including an Internet network or the network server (see 220 of FIG. 1) thereof.

The network interface unit 120 may include a wireless communication unit for wirelessly connecting the image display device 100 to the Internet. For wireless Internet connection, a communication system such as Wireless Local Area Network (WLAN) (Wi-Fi), Wireless broadband (Wibro), a World Interoperability for Microwave Access (Wimax) or High Speed Downlink Packet Access (HSDPA) may be used.

The network interface unit 120 may receive content or data provided by a content provider or a network manager over a network. That is, the network interface unit 120 may receive content provided by the content provider, such as broadcasts, games, Video On Demand (VOD), or broadcast signals, and information associated therewith over the network. In addition, the network interface unit 120 may receive update information and an update file of firmware provided by the network manager.

In addition, the network interface unit 120 may be connected to a communication network for video or voice call. The communication network may include a broadcast type communication network connected through a LAN, a public telephone network, a mobile communication network or the like.

The external device input/output unit 130 may connect the external device (see 230 of FIG. 1) and the image display device 100. The external device input/output unit 130 may include an A/V input/output unit or a wireless communication unit.

The external device input/output unit 130 is connected to the external device such as a Digital Versatile Disk (DVD), a Blu-ray player, a game console, a camcorder or a computer (notebook type computer) in a wired/wireless manner. The external device input/output unit 130 sends a video signal, an audio signal or a data signal received from the connected external device to the control unit 170 of the image display device 100. The video signal, the audio signal or the data signal processed by the control unit 170 may be output to the connected external device.

The A/V input/output unit is a module for inputting the video signal and the audio signal of the external device to the image display device 100 and may include one or more of an Ethernet port, a Universal Serial Bus (USB) port, a Composite Video Banking Sync (CVBS) terminal, a component terminal, an S-video terminal (analog), a Digital Visual Interface (DVI) terminal, a High Definition Multimedia Interface (HDMI) terminal, an RGB terminal and a D-SUB terminal.

The wireless communication unit may perform wireless communication with another external device. The image display device 100 may be connected to another external device over a network according to the communication standard such as Bluetooth, Radio Frequency Identification (RFID), Infrared Data Association (IrDA), Ultra Wideband (UWB), or ZigBee.

In addition, the external device input/output unit 130 may be connected to various set-top boxes through at least one of the above-described various terminals so as to perform an input/output operation with the set-top boxes.

For example, a set-top box is a set-top box for Internet Protocol TV (IPTV), the external device input/output unit 130 may send the video, audio or data signal processed by the set-top box for IPTV to the control unit 170 so as to perform bidirectional communication. In addition, the signals processed by the control unit 170 may be sent to the set-top box for IPTV.

The IPTV may include ADSL-TV, VDSL-TV, FFTH-TV or the like according to the types of transmission networks or include TV over DSL, Video over DSL, TV over IP (TVIP), Broadband TV (BTV), or the like. In addition, the IPTV may include an Internet TV capable of Internet access or a full-browsing TV.

The image display device 100 may be controlled by a signal transmitted by a remote control device 200. A user may input a command such as power on/off, channel up/down, volume up/down or the like to the image display device 100 using the remote control device 200. The remote control device 200 transmits a signal including a command corresponding to user manipulation to the image display device 100. The image display device 100 may identify the signal received from the remote control device 200, generate a control signal according to the identified signal, and perform an operation according to the command included in the signal.

The remote control device 200 may transmit the signal to the image display device 100 according to the IR communication system. In addition, the remote control device 200 may transmit the signal to the image display device 100 or receive the signal transmitted from the image display device 100 according to different wireless communication system. The remote control device 200 may sense user's motion and transmit a signal including a command corresponding to the motion to the image display device 100. In the present embodiment, it is assumed that the remote control unit 200 is a motion sensing remote controller. According to various embodiments of the present invention, the remote control device 200 may be a general wired/wireless mouse, an air mouse, or a remote controller having various pointing units or various shapes (a ring, a bracelet, a thimble, or the like). The user input interface unit 140 may include a wireless communication unit for wirelessly transmitting or receiving a signal to or from the remote control device 200 and a coordinate calculation unit for calculating a coordinate of a pointer corresponding to the motion of the remote control device 200. The user input interface unit 140 may wirelessly transmit or receive a signal to or from the remote control device 200 through an RF module. In addition, the user input interface unit may receive the signal transmitted by the remote control device 200 according to the IR communication system through an IR module.

The coordinate calculation unit of the user input interface unit 140 may correct hand shake or error from the signal corresponding to the motion of the remote control device 200 received through the wireless communication unit of the user input interface unit 140. The coordinate calculation unit may calculate the coordinate of the pointer to be displayed on the display of the image display device 100 after correcting hand shake or error.

The signal transmitted from the remote control device and input to the image display device 100 through the user input interface unit 140 is output to the control unit 170 of the image display device 100. The control unit 170 may identify information about the motion of the remote control device 200 or the key manipulation from the signal transmitted by the remote control device 200, and generate and output various control signals for controlling the operation of the image display device 100 according to the information.

As another example, the remote control device 200 may calculate the coordinate of the pointer corresponding to the motion of the remote control device 200 and output the coordinate to the user input interface unit 140. In this case, the user input interface unit 140 may transmit information about the received coordinate of the pointer to the control unit 170, without correcting shake or error.

The storage unit 150 may store a video signal input to the image display device 100 and an audio signal and a data signal associated with the video signal. For example, a moving image storage command may be input to the image display device 100 while reproducing a moving image based on a broadcast signal. The image display device 100 may store at least a portion of the moving image, which is being reproduced, in the storage unit 150 in correspondence with the input moving image storage command. The image display device 100 may refer to the video signal and the audio signal and data signal associated with the video signal stored in the storage unit 150 when a moving image reproduction command is input.

The control unit 170 controls the overall operation of the image display device 100. The control unit 170 may receive a signal transmitted from the remote control device 200 or another type of control command input unit. In addition, the control unit may receive a command through a local key included in the image display device 100. The control unit 170 identifies the command included in the received signal or the command corresponding to local key manipulation and controls the image display device 100 according to the command.

For example, when the user inputs a command for selecting a predetermined channel, the control unit 170 controls the broadcast signal reception unit 110 such that a broadcast signal provided by the selected channel is input through the broadcast signal reception unit 110. In addition, the video signal and the audio signal of the selected channel may be processed and output to the display unit 180 or the audio output unit 185. In addition, information about the channel selected by the user may be output through the display unit 180 or the audio output unit 185 together with the video signal and the audio signal.

The control unit 170 may process the video signal or the audio signal based on the information included in the data signal received together with the video signal or the audio signal. For example, the control unit 170 identifies the format or the like of the video signal using the data signal associated with the input video signal and processes the video signal input to the image display device 100 according to the format.

The control unit 170 may generate an On-Screen Display (OSD) signal for performing OSD associated with the video generated based on the video signal from the data signal associated with the video signal. In addition, a graphical user interface may be generated so as to enable the user to check information associated with the image display device 100 or input an image display device control command to the image display device 100.

The user may input different types of video or audio output commands through the remote control device 200 or different types of control command input units. For example, the user may wish to view a camera or camcorder image signal input through the external device input/output unit 130, instead of the broadcast signal. In this case, the control unit 170 may process the video signal or the audio signal input to the image display device 100 such that the video signal or the audio signal input through a USB input unit or the like of the external device input/output unit 130 is output through the display unit 180 or the audio output unit 185.

The control unit 170 of the present embodiment may process an image signal such that a 2D or 3D image signal received from the external device is displayed on the display unit 180. In addition, the control unit 170 may process the image signal such that the generated graphical user interface is stereoscopically displayed on the display unit 180. The control unit 170 will be described in detail later with reference to FIG. 3.

The display unit 180 may convert an image signal, a data signal and an OSD signal processed by the control unit 170 or an image signal, a data signal or the like received through the external device input/output unit 130 into RGB signals and generate driving signals. The display unit 180 may display a screen according to the driving signals. The display unit 180 may be a Plasma Display Panel (PDP), a Liquid Crystal Display (LCD), an Organic Light Emitting Diode (OLED) display, a flexible display, or the like. The image display device 100 and the display unit 180 according to the embodiment of the present invention may perform 3D display.

The 3D display may be divided into a supplementary display type and a single display type according to a 3D image recognition method of a user.

In the single display type, a 3D image is implemented on a display without a separate subsidiary device. A user who views a single-display type display can view a 3D image without a subsidiary device (e.g., polarized glasses). The single display type may include a lenticular type, a parallax barrier type, or the like.

In the supplementary display type, a 3D image is implemented using a subsidiary device. The supplementary display type includes a Head-Mounted Display (HMD) type, a glasses type, or the like. Polarized glasses, shutter glasses, a spectrum filter or the like may be applied as glasses used in the glasses type.

Meanwhile, if the display unit 180 is a touch screen, the display device 180 may function as an input device as well as an output device.

The audio output unit 185 receives the audio signal processed by the video/audio processing unit 170, for example, a stereo signal, a 3.1 channel signal or a 5.1 channel signal, and outputs audio. The audio output unit 185 may be implemented by various types of speakers.

Figure 3:
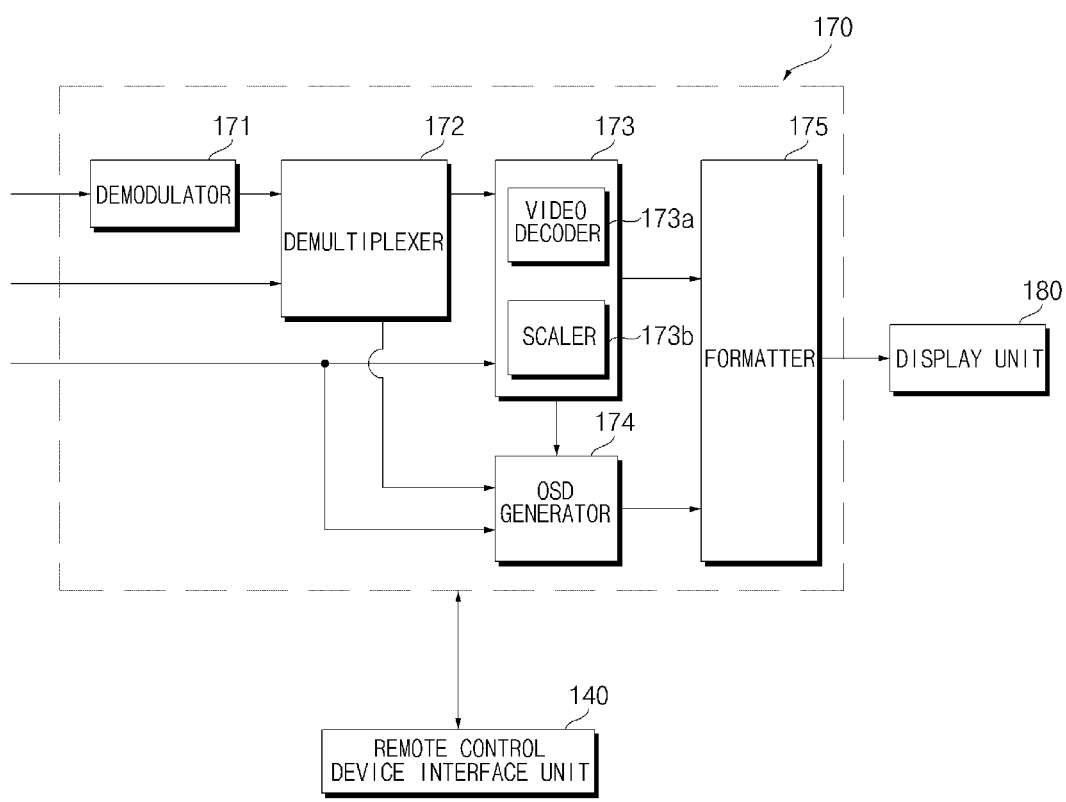
FIG. 3 is a block diagram showing the internal configuration of a control unit of the image display device according to the embodiment of the present invention.

FIG. 3 is a block diagram showing the internal configuration of the control unit 170 of the image display device according to the embodiment of the present invention.

The control unit 170 may include a demodulator 171, a demultiplexer 172, a decoder 173, an OSD generator 174, and a formatter 175. The demodulator 171 may perform an operation for demodulating a broadcast signal received from the broadcast signal reception unit 110.

For example, the demodulator 171 may receive and demodulate a Digital Intermediate Frequency (DIF) signal converted by the broadcast signal reception unit 110. The demodulator 171 may perform channel coding. The demodulator 171 may include a convolutional decoder, a deinterleaver, a Reed-Solomon decoder and the like and perform convolution decoding, deinterleaving and Reed-Solomon decoding.

The demodulator 171 may perform demodulation and channel decoding and output a Transport Stream (TS) signal. The TS signal may be a signal in which a video signal, an audio signal and a data signal are multiplexed. For example, the TS signal may be an MPEG-2 TS in which an MPEG-2 standard video signal, a Dolby AC-3 standard audio signal and the like are multiplexed. In detail, the MPEG-2 TS may include a 4-byte header and a 184-byte payload.

The demodulator 171 may be separately included according to the ATSC system and the DVB system. The TS signal output from the demodulator 171 may be input to the demultiplexer 172.

The demultiplexer 172 may demultiplex the received TS signal, for example, the MPEG-2 TS into the audio signal, the audio signal and the data signal. The TS signal input to the demultiplexer 172 may be a TS signal output from the demodulator 171, the network interface unit 120 and the external device input/output unit 130.

The demultiplexed data signal may be a coded data signal. The coded data signal may include Electronic Program Guide (EPG) information including broadcast information such as a title, a start time and an end time of a broadcast program broadcaston each channel. For example, the EPG information may include ATSC-Program and System Information Protocol (ATSC-PSIP) information in the ATSC system and include DVB-Service Information (DVB-SI) in the DVB system.

The decoder 173 may decode the demultiplexed signal. The decoder 173 of the present embodiment may include a video decoder 173a for decoding the demultiplexed video data and a scaler 173b for adjusting the resolution of the decoded video signal such that the decoded video signal is output by the image display device 100.

The OSD generator 174 may generate an OSD signal such that an object is displayed on the display unit 180 as an OSD. The OSD may indicate information associated with the image displayed on the display unit 180. In addition, the OSD may include a control signal for controlling the operation of the image display device 100 or a user interface for receiving a user command or the like.

The OSD generator 174 according to the embodiment of the present invention may extract a thumbnail image corresponding to a reproduction time of content reproduced or capable of being reproduced by the image display device 100. The OSD generator 174 may generate and output the OSD signal to the formatter 175 such that a 3D object including the extracted thumbnail image is recognized by the user.

The formatter 175 may identify the format of the input video signal by referring to the data signal associated with the video signal. The formatter 175 may convert the input video signal into a format suitable for the display unit 180 and output the converted signal to the display unit 180.

The image display device 100 of the present embodiment may display a 3D image on the display unit 180. In this case, the formatter 175 may generate a 3D image signal according to a predetermined format suitable for displaying the input image signal on the display unit 180. In the embodiment of the present invention, the 3D image signal may include a left-eye image signal and/or a right-eye image signal. As described above, in the embodiment of the present invention, a left-eye image and a right-eye image may be used to implement the 3D image. A left-eye image signal may be an image signal for displaying the left-eye image and a right-eye image signal may be an image signal for displaying the right-eye image. The formatter 175 outputs the generated 3D image signal to the display unit 180. The display unit 180 displays the 3D image based on the generated 3D image signal.

In the present embodiment, the image display device 100 may display the OSD as a 3D object according to the OSD signal generated by the OSD generator 174. The formatter 175 may convert the OSD signal generated by the OSD generator 173 into a 3D image signal with a format, which is capable of being displayed on the display unit 180, and output the converted 3D image signal to the display unit 180, such that multiview images configuring the 3D object, e.g., the left-eye image and the right-eye image configuring the 3D object, are displayed on the display unit 180.

The image display device 100 including a separate user interface generation unit may further include a mixer for mixing the video signal output from the decoder 173 and the OSD generator 174 with a user interface image signal output from the user interface generation unit. The mixer may be included in the formatter 175 in order to mix the video signals output from the decoder 173 and the OSD generator 174.

FIG. 4 is a diagram showing an example of a 3D image signal format for implementing a 3D image. The 3D image signal format may be determined according to a method of arranging the left-eye image and the right-eye image generated for implementing the 3D image.

The 3D image may include multiview images. The user may view the multiview images through his/her left eye and right eye. The user may experience a stereoscopic effect of the 3D image through an image difference sensed through the left eye and the right eye. The multiview images for implementing the 3D image include the left-eye image recognized by the user's left eye and the right-eye image recognized by the user's right eye, according to the embodiment of the present invention.

As shown in FIG. 4A, a format in which the left-eye image and the right-eye image are arranged in a horizontal direction may be called a side-by-side format. As shown in FIG. 4B, a format in which the left-eye image and the right-eye image are arranged in a vertical direction is called a top/down format. As shown in FIG. 4C, a format in which the left-eye image and the right-eye image are time-divisionally arranged is called a frame sequential format. As shown in FIG. 4D, a format in which the left-eye image and the right-eye image are mixed in line units is called an interlaced format. As shown in FIG. 4E, a format in which the left-eye image and the right-eye image are mixed in box units is called a checker box format.

The image signal included in the signal input to the image display device 100 may be a 3D image signal for implementing a 3D image. In addition, a graphical user interface image signal generated for indicating information associated with the image display device 100 or inputting a command associated with the image display device 100 may be a 3D image signal. The formatter 175 may mix the 3D image signal included in the signal input to the image display device 100 and the graphical user interface 3D image signal and output the mixed signal to the display unit 180.

The formatter 175 may identify the format of the mixed 3D image signal by referring to the associated data signal. The formatter 175 may process the 3D image signal so as to suit the identified format and output the processed 3D image signal to the display unit 180. If the 3D image signal format which can be output by the display unit 180 is limited, the formatter 175 may convert the received 3D image signal so as to suit the 3D image signal format which can be output by the display unit 180 and output the converted image to the display unit 180.

The OSD generator 174 may generate the OSD signal. In detail, the OSD generator 174 may generate a signal for displaying a variety of information on the screen of the display unit 180 as a graphic or text, based on at least one of the image signal and the data signal or a user input signal input through the remote control device or different types of control command input unit. In addition, the OSD generator 174 may generate a signal for displaying a graphic or a text in order to input a control command to the image display device 100. The generated OSD signal may be output to the display unit 180 together with the image-processed image signal and the data-processed data signal.

The OSD signal is generated in order to display a graphic or a text and may include information about a user interface screen, various menu screens, a widget, an icon, or the like, which can be displayed on the display unit 180. The OSD generator 174 may generate the OSD signal as a 2D image signal or a 3D image signal. The OSD signal generated by the OSD generator 174 may include a graphical user interface 3D image signal mixed with another image signal.

The display unit 180 may display an object according to the OSD signal generated by the OSD generator 174. The object of the present embodiment may be one of a volume adjustment button, a channel adjustment button, an image display device control menu, an icon, a navigation tap, a scroll bar, a progressive bar, a text box, and a window.

The user may recognize information about the image display device 100 or information about the image displayed by the image display device 100 through the object displayed on the display unit 180. In addition, a command may be input to the image display device 100 through the object displayed by the image display device 100. The 3D object of the present specification is a stereoscopic object to which a stereoscopic effect is applied. The 3D object may be a Picture In Picture (PIP) image, EPG indicating broadcast program information, various menus of the image display device, a widget, an icon, or the like.

FIG. 5 is a diagram showing various scaling modes of the 3D image signal or various shapes of the image according to the embodiment of the present invention. The size adjustment or the slope adjustment of the 3D object will be described with reference to FIG. 5.

The control unit 170 or the module for processing the image, such as the scaler included in the control unit 170, may magnify or reduce the 3D image signal or the 3D object 510 included in the 3D image signal by a predetermined ratio (513), as shown in FIG. 5(*a*). This is a general function of image processing of the scaler or the control unit.

In addition, the control unit 170 may change the shape of the screen to a polygon such as a trapezoid or a parallelogram, in order to represent an image rotated at a predetermined angle and an image tilted in a predetermined direction. For display of a tilted or rotated screen, an image signal which is processed in a shape such as a trapezoid or a parallelogram may be received. If the control unit generates the 3D image signal or the 3D object or the like corresponding to the OSD and outputs the 3D image signal to the display unit, the control unit 170 generates the 3D image with the trapezoid 516 shown in FIG. 5(*b*) or the parallelogram 519 shown in FIG. 5(*c*).

In the case where the image received from the broadcast station (see 210 of FIG. 1), the network server (see 230 of FIG. 1) or the external input device (see 230 of FIG. 1) or the 3D object or the 3D image such as the OSD generated by the control unit 170 is magnified or reduced as shown in FIG. 5(*a*) or in the case where the 3D image signal is generated or processed so as to have the shape such as the trapezoid 516 or the parallelogram 519 as shown in FIG. 5(*b*) or 5(*c*), the stereoscopic effect, that is, the 3D effect, of the 3D image signal or the 3D object in the 3D image signal can be further emphasized. Accordingly, the stereoscopic effect of the image is diversified and maximized.

The slope effect or the rotation effect applied to the image according to the shape of the image may be controlled by adjusting a difference between the lengths of both parallel sides of the trapezoid 516 shown in FIG. 5(*b*) or a difference between opposite angles of the parallelogram shown in FIG. 5(*c*).

In this case, even in one 3D image or 3D object, a tilting effect may be generated by applying different disparities to every portion. That is, in order to enable the image to seem to be tilted or rotated, a portion with a great sense of depth and a portion with a small sense of depth coexist even in one 3D image or 3D object. This indicates that different disparities are partially applied to a pair of left- and right-eye images.

When one image of the left-eye image and the right-eye image for displaying the 3D image or the 3D object is generated by the scaler or the OSD generator of the control unit 170 in the shape shown in FIG. 5, the generated left-eye or right-eye image is copied so as to generate the other image. Accordingly, it is possible to generate a pair of left- and right-eye images.

The scale adjustment of the 3D image signal or the 3D object may be performed by the above-described formatter 175 of the control unit 170. The 3D image signal of FIG. 5 may be a left-eye image signal, a right-eye image signal or a mixture of the left-eye image signal and the right-eye image signal.

The formatter 175 may receive the decoded image signal, separate the image signal into a 2D image signal and 3D image signal, and separate the 3D image signal into a left-eye image signal and a right-eye image signal. The left-eye image signal and the right-eye image signal may be changed to have at least one shape of the various examples of FIG. 5 and may be output with a predetermined format shown in FIG. 4. Scaling may be performed before or after the output format is formed.

The formatter 175 receives the OSD signal of the OSD generator 174 or the OSD signal mixed with the decoded image signal, separates the OSD signal into 3D image signals, and separates the 3D image signal into multiview image signals. For example, the 3D image signal may be separated into a left-eye image signal and a right-eye image signal. The separated left-eye and right-eye image signals may be scaled as shown in FIG. 5 and output with a predetermined format shown in FIG. 4.

The OSD generator 174 may directly perform the process of generating the image signal or the scaling process, which is described above in regard to the OSD output. If the OSD generator 174 directly performs the scaling of the OSD, the formatter 175 does not need to perform the scaling of the OSD. In this case, the OSD generator 174 scales the OSD signal according to the depth or the slope of the OSD and outputs the OSD signal in a suitable format, in addition to the generation of the OSD signal. At this time, the format of the OSD signal output from the OSD generator 174 may be any one of the left-eye image signal, the right-eye image signal or various combination formats of the left-eye image signal and the right-eye image signal as shown in FIG. 4. At this time, the output format is equal to the output format of the formatter 175.

Figure 6:
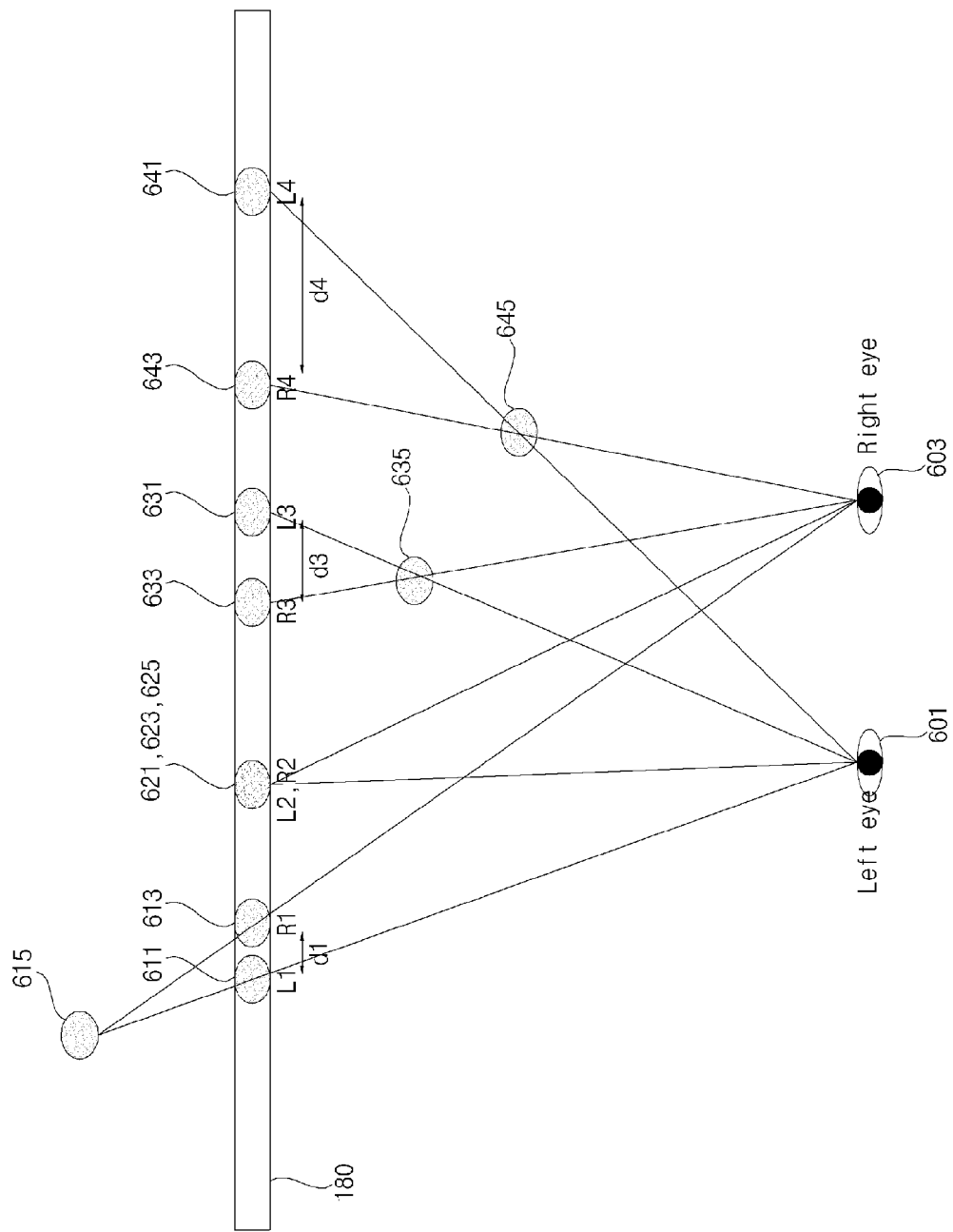
FIG. 6 is a diagram showing a state of changing a sense of depth of a 3D image or a 3D object according to the embodiment of the present invention.

FIG. 6 is a diagram showing a state of changing a sense of depth of a 3D image or a 3D object according to the embodiment of the present invention.

According to the above-described embodiment of the present invention, the 3D image includes multiview images and the multiview images include a left-eye image and a right-eye image. A state in which an image forming position recognized by the user is changed by a distance between the left-eye image and the right-eye image is shown in FIG. 6. The stereoscopic effect or the perspective effect of the image recognized by the user will be described according to the distance or disparity between the left-eye image and the right-eye image with reference to FIG. 6.

In FIG. 6, a plurality of images or a plurality of objects having different senses of depth is shown. These objects are called a first object 615, a second object 625, a third object 635, and a fourth object 645.

That is, the first object 615 includes a first left-eye image based on a first left-eye image signal and a first right-eye image based on a first right-eye image signal. That is, the image signal for displaying the first object includes the first left-eye image signal and the first right-eye image signal. FIG. 6 shows where the first left-eye image based on the first left-eye image signal and the first right-eye image based on the first right-eye image signal are displayed on the display unit 180. In addition, FIG. 6 shows the distance between the first left-eye image and the first right-eye image displayed on the display unit 180. The description of the first object may be applied to the second to fourth objects. Hereinafter, for convenience of description, the left-eye image and the right-eye image displayed on the display unit 180 for one object, the distance between the two images, and the serial number of the object will be unified.

The first object 615 includes the first right-eye image 613 (denoted by R1 in FIG. 6) and the first left-eye image 611 (denoted by L1 in FIG. 6). The distance between the first right-eye image 613 and the first left-eye image 611 is set to d1. The user sees an image that appears to be formed at an intersection of a line connecting the left eye 601 and the first left-eye image 611 and a line connecting the right eye 603 and the first right-eye image 613. Accordingly, the user sees the first object 615 that appears to be located in back of the display unit 180. The distance between the display unit 180 and the first object 615 recognized by the user may be expressed as depth. In the present embodiment, the depth of the 3D object which appears to the user to be located in back of the display unit 180 has a negative value (−). Accordingly, the depth of the first object 615 has a negative value.

The second object 625 includes a second right-eye image 623 (denoted by R2) and a second left-eye image 621 (denoted by L2). According to the present embodiment, the second right-eye image 623 and the second left-eye image 621 are displayed on the same position as the display unit 180. The distance between the second right-eye image 623 and the second left-eye image 621 is 0. The user sees an image that appears to be formed at an intersection of a line for connecting the left eye 601 and the second left-eye image 621 and a line for connecting the right eye 603 and the second right-eye image 623. Accordingly, the user sees the second object 625 that appears to be displayed on the display unit 180. In this case, the second object 625 may be referred to as a 2D object or a 3D object. The second object 625 has the same depth as the display unit 180 and the depth of the second object 625 is 0.

The third object 635 and the fourth object 645 are examples of 3D objects which appear to the user to be protruded from the display unit 180 toward the user. The change in perspective effect or stereoscopic effect recognized by the user according to the change in distance between the left-eye image and the right-eye image will be described with reference to the examples of the third object 635 and the fourth object 645.

The third object 635 may include a third right-eye image 633 (denoted by R3) and a third left-eye image 631 (denoted by L3). A distance between the third right-eye image 633 and the third left-eye image 631 is set to d3. The user sees an image that appears to be formed on an intersection of a line for connecting the left eye 601 and the third left-eye image 631 and a line for connecting the right eye 603 and the third right-eye image 633. Accordingly, the user sees the third object 635 that appears to be located in front of the display unit 180, that is, closer to the user. That is, the user see the third object 635 that appears to be protruded from the display unit 180 toward the user. In the present embodiment, the depth of the 3D object which is felt by the user as if it is located in front of the display unit 180 has a positive value (+). Accordingly, the depth of the third object 635 has a positive value.

The fourth object 645 may include a fourth right-eye image 643 (denoted by R4) and a fourth left-eye image 641 (denoted by L4). A distance between the fourth right-eye image 643 and the fourth left-eye image 641 is set to d4. Here, an inequality of "d3<d4" is satisfied between the distances d3 and d4. The user sees an image that appears to be formed at an intersection of a line connecting the left eye 601 and the fourth left-eye image 641 and a line connecting the right eye 603 and the fourth right-eye image 643. Accordingly, the user sees the fourth object 645 that appears to be located in front of the display unit 180, that is, closer to the user, and is located closer to the user than the third object 635. That is, the user sees the fourth object 645 that appears to be protruded from the display unit 180 and the third object 635 toward the user. The depth of the fourth object 645 has a positive value.

The image display device 100 may adjust the positions of the left-eye image and the right-eye image displayed on the display unit 180 such that the user sees the object including the left-eye image and the right-eye image that appears to be located in back of or in front of the display unit 180. The image display device 100 may adjust the display distance between the left-eye image and the right-eye image displayed on the display unit 180 so as to adjust the sense of depth of the object including the left-eye image and the right-eye image.

That is, according to the description of FIG. 6, it can be seen that a determination as to whether or not the depth of the object including the left-eye image and the right-eye image has a positive value (+) and a negative value (−) is made according to the left and right display positions of the left-eye image and the right-eye image. As described above, the object having the depth of the positive value appears to the user to be located in front of the display unit 180. The object having the depth of the negative value appears to the user to be located in back of the display unit 180.

Referring to FIG. 6, it can be seen that the sense of depth of the object, that is, the distance between a position point of the 3D image recognized by the user and the display unit 180, is changed according to an absolute value of the distance between the left-eye image and the right-eye image.

Figure 7:
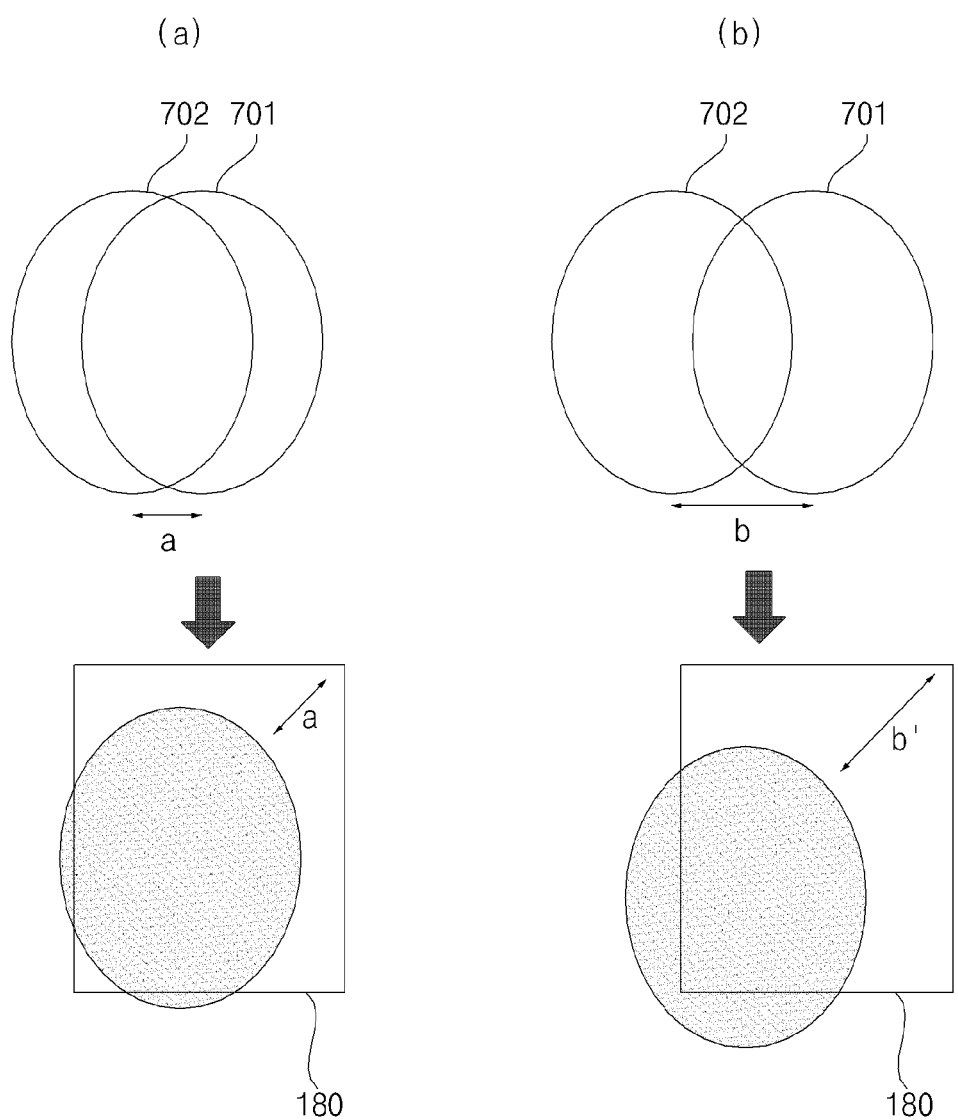
FIG. 7 is a diagram showing a state of controlling a sense of depth of an image according to the embodiment of the present invention.

FIG. 7 is a diagram showing a state of controlling a sense of depth of an image according to the embodiment of the present invention. Referring to FIG. 7, it can be seen that the sense of depth of the same image of the same 3D object is changed according to the distance between the left-eye image 701 and the right-eye image 702 displayed on the display unit 180. In the present embodiment, the depth of the display unit 180 is set to 0. The depth of the image that appears to the user to be located in front of the display unit 180 is set to a positive value.

The distance between the left-eye image 701 and the right-eye image 702 shown in FIG. 7(a) is a. The distance between the left-eye image 701 and the right-eye image 702 shown in FIG. 7(b) is b. Here, b is larger than a. That is, the distance between the left-eye image 701 and the right-eye image 702 in the example shown in FIG. 7(b) is greater than that in the example shown in FIG. 7(a).

In this case, as described with reference to FIG. 6, the sense of depth of the 3D image or the 3D object shown in FIG. 7(b) is larger than that of the 3D image or the 3D object shown in FIG. 7(a). If the senses of depth of FIGS. 7(a) and 7(b) are respectively expressed by values a' and b', a relationship of a'<b' is satisfied according to a relationship of a<b. That is, in order to implement a 3D image which appears to the user to be located in the front of the display unit, the distance between the left-eye image 701 and the right-eye image 702 is increased or decreased so as to increase or decrease the sense of depth.

FIG. 8 is a diagram illustrating an example of a method of implementing a 3D UI image according to the present invention.

Figure 8A:
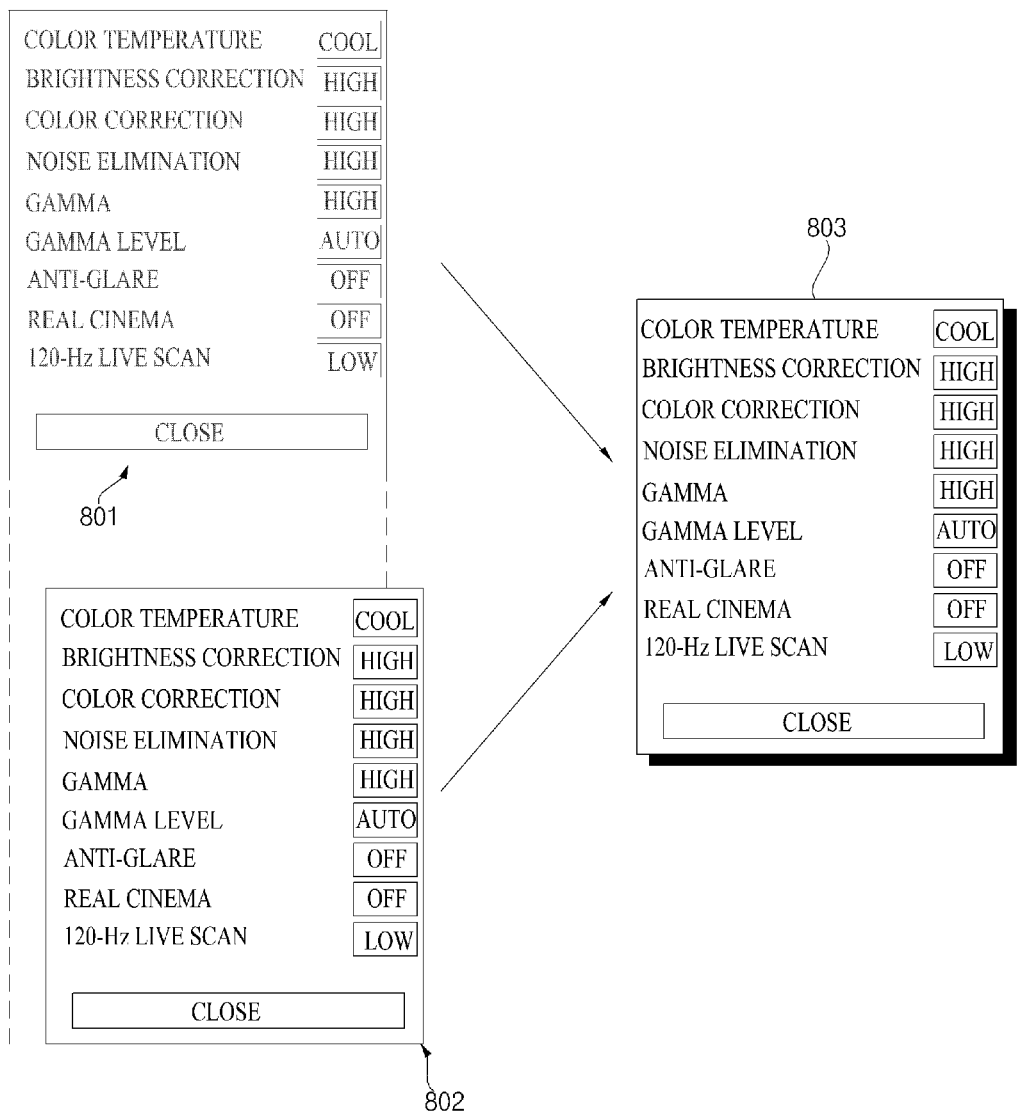
FIG. 8 is a diagram illustrating an example of a method of implementing a 3D UI image according to the present invention.
Figure 8B:
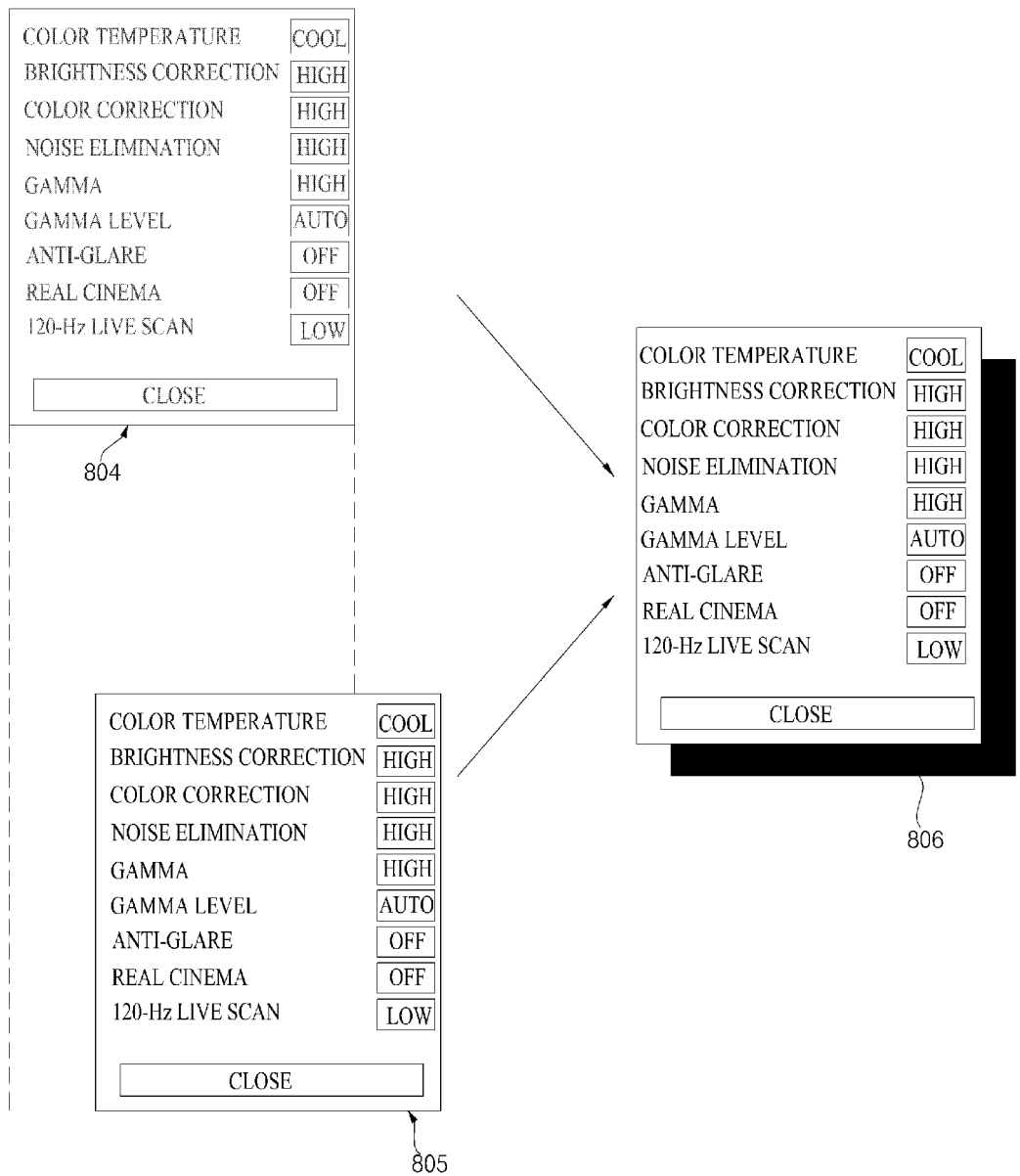

FIGS. 8(a) and 8(b) show the case where an overall UI image including a plurality of items is implemented as a 3D image. In FIG. 8(a), the distance between a left-eye image 801 and a right-eye image 802 configuring the UI image is small. In FIG. 8(b), the distance between a left-eye image 804 and a right-eye image 805 configuring the UI image is large.

Accordingly, based on the principle of FIG. 6, a 3D UI 803 shown in FIG. 8(a) appears to be located at a long distance because an image is formed on a place located far from the user's eyes, and a 3D UI 806 shown in FIG. 8(b) appears to be relatively protruded because an image is formed on a place close to the user's eyes. By using the above principle, that is, adjusting the distance between the left-eye image and the right-eye image configuring the UI image, it is possible to adjust the sense of depth of the UI image.

Figure 9:
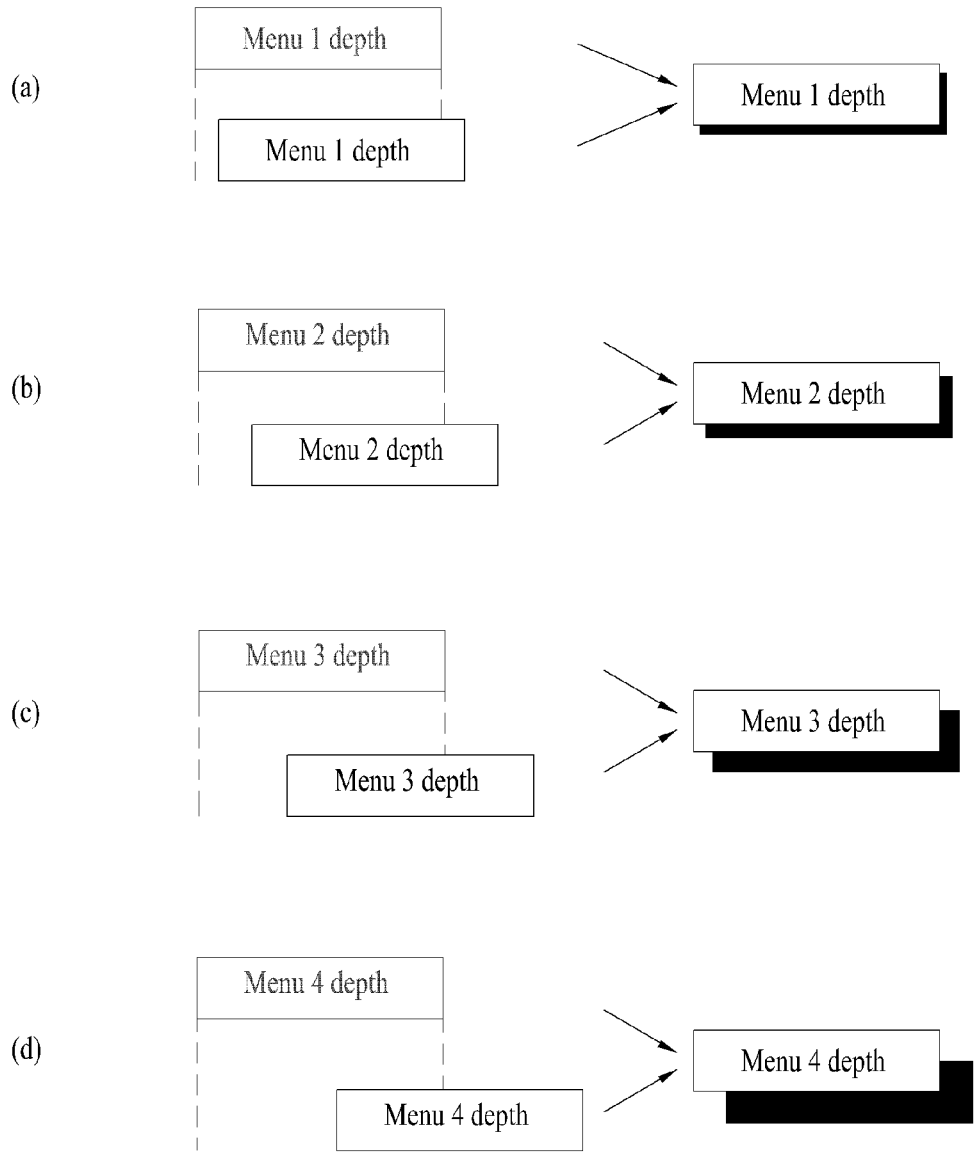
FIG. 9 is a diagram illustrating another example of a method of implementing a 3D UI according to the present invention.

FIG. 9 is a diagram illustrating another example of a method of implementing a 3D UI according to the present invention.

While FIG. 8 shows the case of implementing the overall UI image as the 3D image, FIG. 9 shows the case of implementing a selected item in the UI as a 3D object or a 3D image. In FIGS. 9(a) to 9(d), various disparities between the left-eye image and the right-eye image for configuring the item in the UI image as the 3D image are shown.

It can be seen that the distance between the left-eye image and the right-eye image configuring the item is gradually increased from FIG. 9(a) to FIG. 9(d). If such a principle is used, the image display device may implement a specific item in the UI image or the overall UI image as the 3D image such that the sense of depth is gradually changed according to the elapse of time.

As shown in FIG. 9, the image display device may adjust the distance between the left-eye image and the right-eye image so as to provide a sense of depth, with respect to only the selected item of various items configuring the UI image as described above, and configure the residual items as 2D images.

Figure 10:
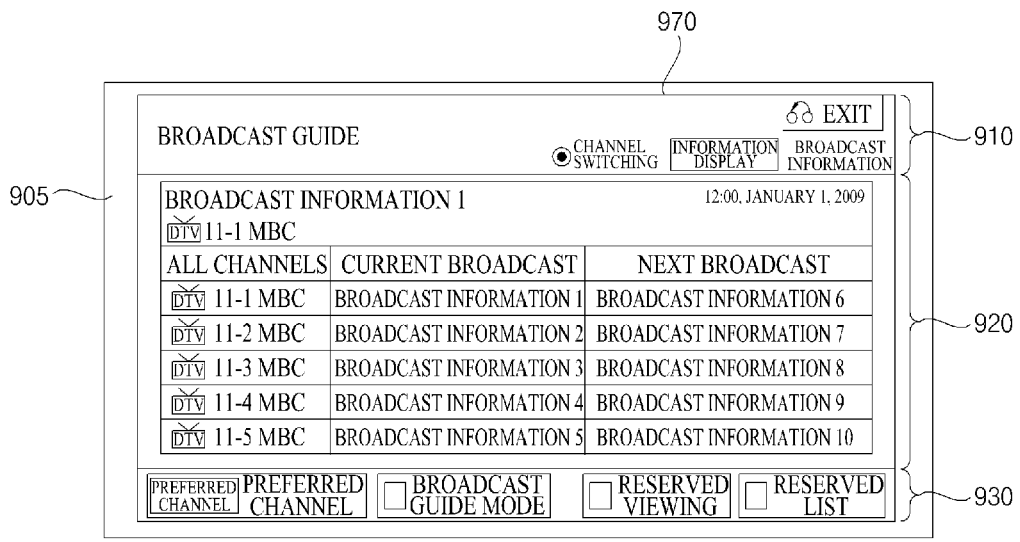
FIGS. 10 to 11 are diagrams illustrating UI images according to the embodiment of the present invention.
Figure 11:
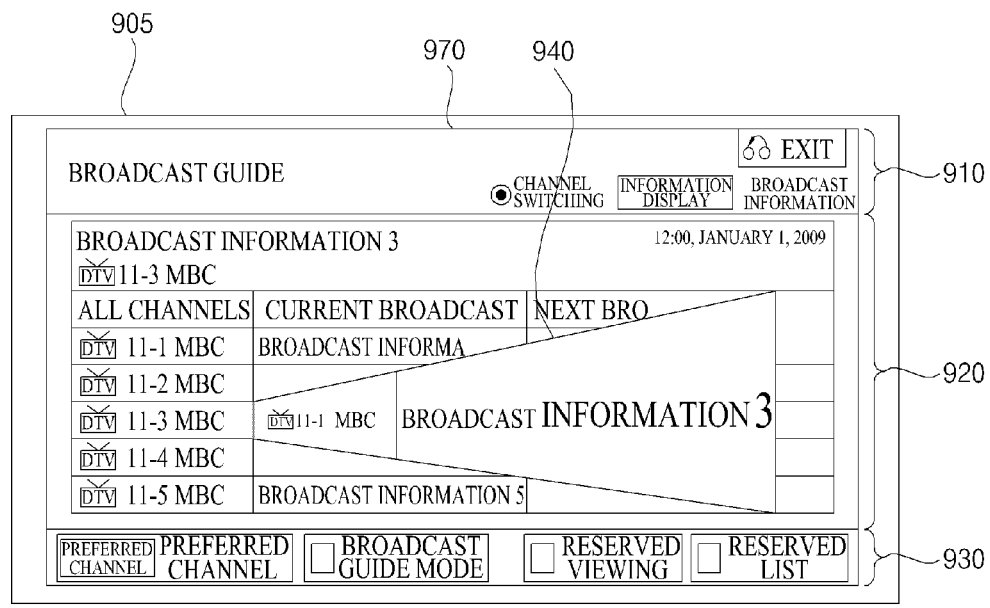

FIGS. 10 to 11 are diagrams illustrating UI images according to the embodiment of the present invention.

Referring to FIG. 10, a broadcast guide UI image 970 is implemented through an OSD on a first screen 905 for providing content. The broadcast guide UI image 970 includes a first region 910 including information such as a title for identifying the UI, a second region 920 including items such as channel information, time information and broadcast information, and a third region 930 including a sub menu to a supplementary information item. Here, all the regions and the items of the UI image 970 are implemented as 2D images. If the broadcast guide UI 970 is output to the screen, the content output on the first screen 905 is inactivated or shaded because the broadcast guide UI region 970 is displayed. The title item of the UI is displayed in the first region 910. Here, in the first region 910, a supplementary information selection item such as channel switching may be further included together with the title item.

In the second region 920, a first item including time information, a second item for providing a channel list, and third and fourth items including broadcast information of a current broadcast and a next broadcast of each channel of the second item.

In the second region 930, items corresponding to various functions which can be provided by the UI, for example, functions of a preferred channel, a broadcast guide mode, reserved viewing, a reserved list, are included.

A UI image for selecting whether or not an item selected from the broadcast guide UI image 970 is switched to a 3D image may be further displayed together with the broadcast guide UI image 970. Here, the UI image for selecting whether or not the item is switched to the 3D image may be implemented as a 2D or 3D image.

FIG. 11 shows the case where an item selection signal for selecting a specific item from the items included in the UI image is input and an item 940 is selected. The selected item 940 is displayed as a 3D image. In order to display the selection item 940 as the 3D image, the UI image for selecting whether or not the image is switched to the 3D image may be separately provided.

Referring to FIG. 11, the selection item 940 may be implemented as the 3D image, unlike the other items displayed as 2D images. The control unit 170 may implement the selection item 940 as the 3D image by various methods such as a method of tilting the selection item 940, a method of applying a sense of depth to the selection item 940, or a method of applying a 3D effect to the selection item 940.

Hereinafter, among the above methods, for example, the method of applying the sense of depth will be briefly described.

The image display device according to the embodiment of the present invention processes 3D image data using the principle of a stereoscopic method. That is, when one object is photographed using two cameras located at different positions, left-eye image data and right-eye image data are generated, and the generated image data is separated and input to the user's left and right eyes so as to be perpendicular to each other, the brain of the user combines the image data input to the left eye and the right eye so as to generate a 3D image. The arrangement of the image data so as to be perpendicular to each other indicates that interference does not occur in the image data.

Figure 12:
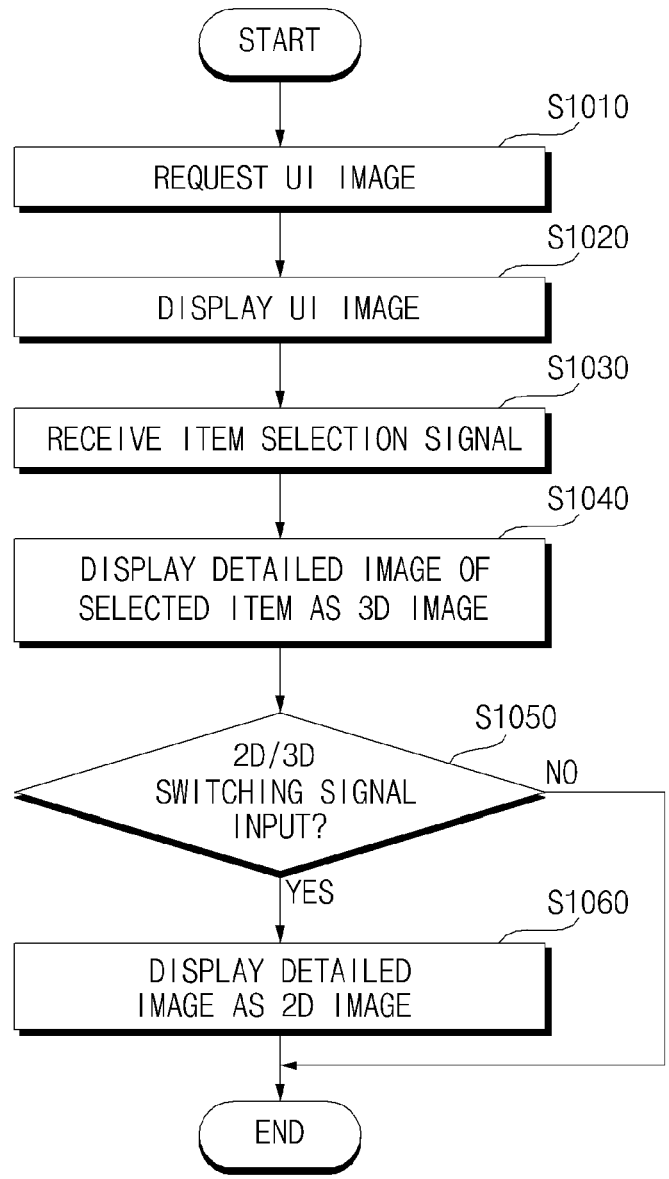
FIG. 12 is a flowchart illustrating a method for operating an image display device according to an embodiment of the present invention.

FIG. 12 is a flowchart illustrating a method for operating an image display device according to an embodiment of the present invention.

The image display device receives a request for a UI image (S1010). Then, the control unit 170 of the image display device displays the requested UI image on the display unit 180 (S1020).

The image display device receives an item selection signal from a user through the user input interface unit 140 (S1030). The item selection signal may be input by the user and may be input through the remote control device or the user input unit. The item selection signal may be input by simply positioning the pointer or the cursor of the remote control device on a desired item for a predetermined time, and a user command or a user signal may be input by pressing or clicking a button of the remote control device corresponding to the desired item. The image display device displays a detailed image of the selected item as a 3D image if the selected item is determined by the item selection signal (S1040).

Here, the UI image and the detailed image may be variously implemented. For example, the UI image may be a broadcast guide UI image for providing broadcast information to the user, a channel detailed image UI image, a video channel list UI image, a menu UI image, or the like. The detailed image may be an image indicating detailed information of the item, which is provided when one of the items included in the UI image is selected.

The UI image may become the detailed image in a relationship with another UI image. For example, if the user selects one channel item from the broadcast guide UI image, the channel detailed information UI image for the channel may be provided as the detailed image. In this case, the detailed image is displayed as a 3D image.

That is, according to the embodiment of the present invention, independently of the request signal for the UI image, when the user may select a specific item included in the UI image and view the detailed image thereof, only the detailed image of the item requested by the user may be displayed as the 3D image.

Thereafter, the detailed image displayed as the 3D image may be switched to a 2D image. The user may input a 2D/3D switching request, in order to switch the detailed image displayed as the 3D image to a 2D image. In contrast, a 2D/3D switching request may be input, in order to switch the detailed image or UI image displayed as the 2D image to a 3D image.

If the image display device receives a 2D/3D switching signal for the 2D/3D switching request with respect to the detailed image or the UI image, the control unit 170 switches the display mode of the detailed image or the UI image to 2D or 3D according to the request content of the 2D/3D switching signal. For example, if the 2D/3D switching request for the detailed image is input and the detailed image is displayed as the 3D image, the control unit 170 switches the detailed image to the 2D image. The image signal for the detailed image switched to the 2D image is output to the display unit 180 such that the display unit 180 displays the detailed image as the 2D image.

If the input of the 2D/3D switching request signal is not sensed, the operation of the image display device is finished.

Figure 13:
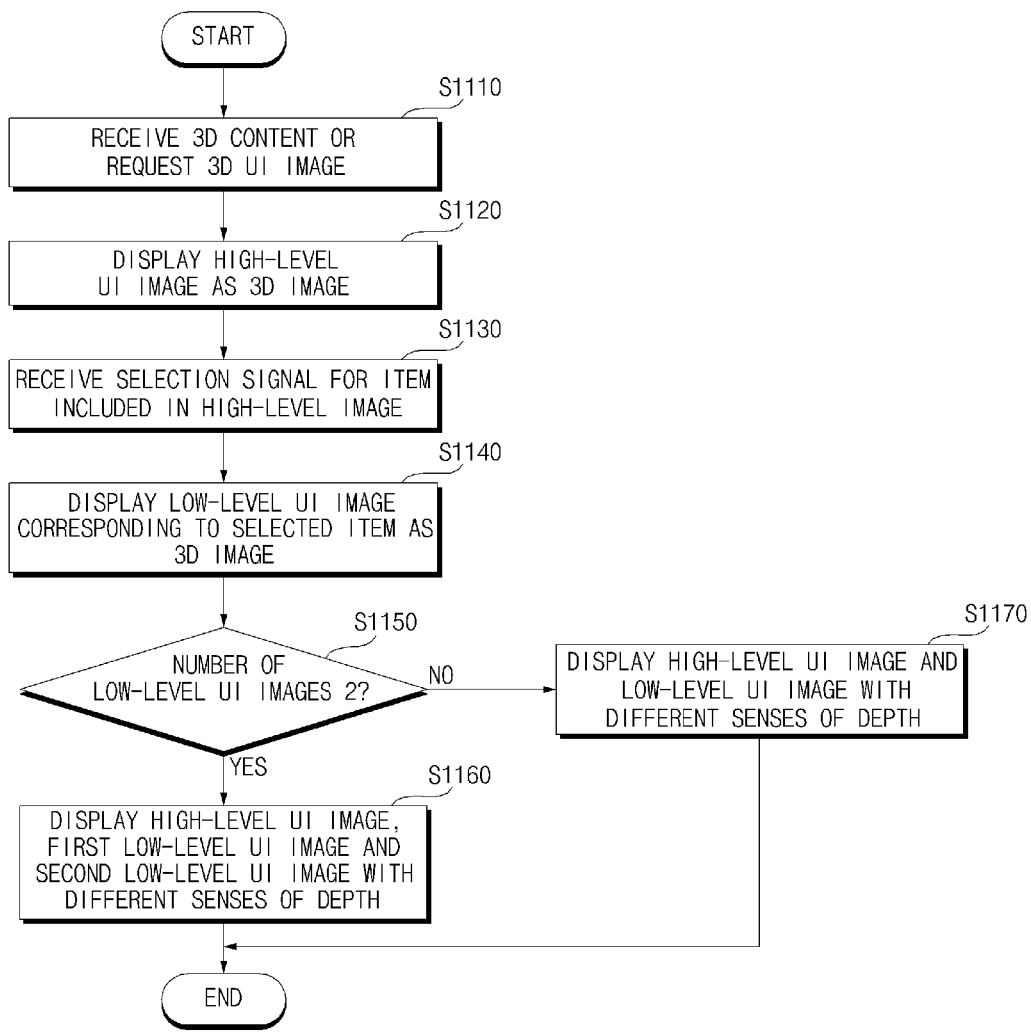
FIG. 13 is a flowchart illustrating a method for operating an image display device according to another embodiment of the present invention.

FIG. 13 is a flowchart illustrating a method for operating an image display device according to another embodiment of the present invention.

In the embodiment described with reference to FIG. 13, a specific UI image and a UI image generated with respect to an item included in the UI image are called a high-level image and a low-level image, respectively. That is, a UI image for providing an item which can be selected by the user is called a high-level UI image, and a UI image provided by selecting one of the items included in the high-level UI image by the user is called a low-level UI image. Accordingly, the high-level and low-level UI images have a relative relationship. If one item is selected from the low-level UI image and another UI image is further displayed with respect to the selected item, the low-level UI image may become a high-level UI image in a relationship with another UI image.

First, 3D content or a request for a 3D UI image is input to the image display device. If the image display device is set such that the 3D UI image is provided according to the input of the 3D content, the 3D UI image may be automatically provided when the 3D content is input.

Even when the request signal for the 3D UI image is received from the user, the 3D UI image is displayed. In particular, if the 3D UI image is provided according to the input of the 3D content, the image display device may determine whether or not the input or received content is 3D content.

According to the above process, the first displayed UI image is a high-level UI image. This is because, unlike the UI image displayed according to item selection, the UI image displayed at the user's request or the content reproduction does not have another high-level UI image. In the present embodiment, the high-level UI image is also displayed as the 3D image (S1120).

An item selection signal for at least one of the items included in the high-level UI image is input by the user (S1130). Then, the image display device displays the low-level UI image corresponding to the item selection signal on the display unit 180 as the 3D image (S1140). Here, the high-level UI image and the low-level UI image have different senses of depth. That is, the high-level UI image and the low-level UI image are displayed in multiple layers. For convenience, two or more low-level UI images are called a first low-level UI image and a second low-level UI image.

When the first low-level UI image and the second low-level UI image are simultaneously displayed, the two low-level images are displayed with the same sense of depth if the levels of the low-level UI images are equal. However, if the levels of the first low-level UI image and the second low-level UI image are not equal, the two UI images are displayed with different senses of depth. For example, if the first low-level UI image has a level higher than that of the second low-level UI image, the sense of depth of the second low-level UI image may be set to be larger than that of the first low-level UI image. As described above, the sense of depth may be adjusted by the disparity between the left-eye image and the right-eye image configuring the UI image.

In the present embodiment, the case where the sense of depth of the high-level UI image is set to be small and the sense of depth of the low-level UI image is set to be large such that a plurality of UI images is displayed in multiple layers is described. However, the senses of depth of the high-level UI image and the low-level UI image are differentiated using various methods, and the sense of depth of each UI image may be set according to the signal input or interest and preference of the user.

The low-level UI image may have a sense of depth, which is smaller than that of the high-level UI image, according to the preference or interest of the user. Accordingly, the control unit 170 determines whether or not two or more low-level UI images are displayed by referring to the number of times the item selection signal is input (S1150). If it is determined that two or more low-level UI images are displayed, the senses of depth of the UI images are separately set. If the total number of high-level UI images and low-level UI images is 3 or more, a high-level UI image, a first low-level UI image and a second low-level UI image may all be displayed with different senses of depth (S1160). Here, it is assumed that the levels of the first low-level UI image and the second low-level UI images are different from each other, the interests and the preferences of the user for the first low-level UI image and the second low-level UI image are different, and the first low-level UI image and the second low-level UI images have different senses of depth according to user command.

If only one high-level UI image and one low-level UI image are displayed, the display unit 180 displays the high-level UI image and the low-level UI image with different senses of depth (S1170).

Figure 14:
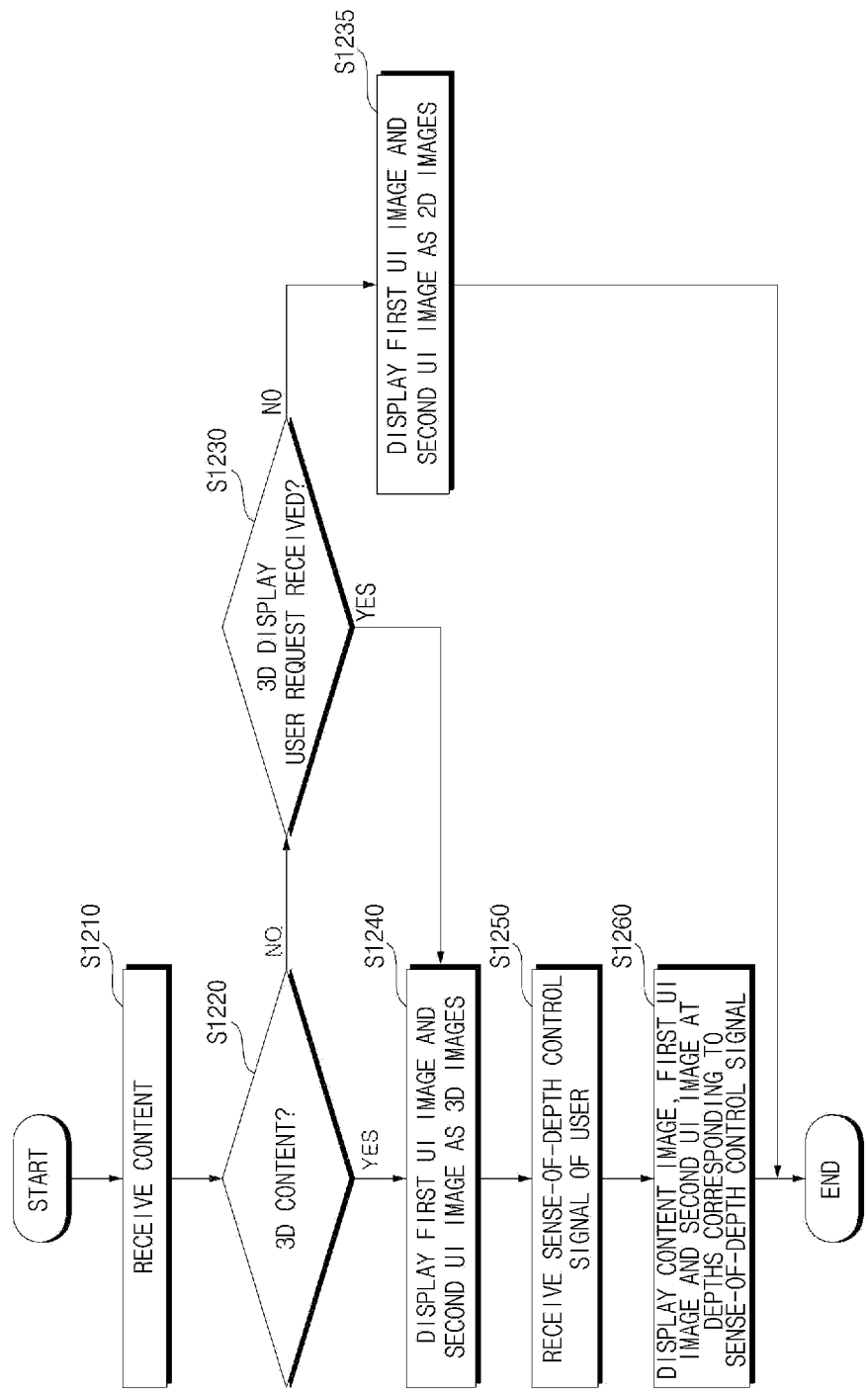
FIG. 14 is a flowchart illustrating a method for operating an image display device according to another embodiment of the present invention.

FIG. 14 is a flowchart illustrating a method for operating an image display device according to another embodiment of the present invention.

As shown in FIG. 14, first, the image display device receives content (S1210). Content stored in the storage unit 150 may be reproduced. The image display device determines whether the received content is 3D content (S1220).

Here, it is assumed that, if the 3D content is input, a default is set such that a UI image is displayed as a 3D image.

Even in the embodiment described with reference to FIG. 14, two or more UI images are displayed. These UI images are called a first UI image and a second UI image.

Here, the first UI image and the second UI image may be the above-described UI image and detailed image, or a high-level UI image and a low-level UI image, or a high-level menu image and a low-level menu image. Alternatively, the first UI image and the second UI image may be an image displayed according to content reproduction and a UI image associated with the content.

According to the embodiment described with reference to FIG. 14, the image display device may determine whether the UI image is displayed as 2D content or 3D content depending on whether the content to be reproduced is 2D content or 3D content. The user may determine whether the UI image is received as a 2D image or a 3D image.

If it is determined that the content to be reproduced is 3D content, the image display device displays the first UI image and the second UI image as 3D images (S1240). Even if it is determined that the content to be reproduced is not 3D content (S1220), that is, even if it is determined that the content to be reproduced is 2D content, the user may input a user signal such that the first UI image and the second UI image are displayed as the 3D images. If a 3D display request of the user for receiving the first UI image and the second UI image for the 2D content as the 3D images is received (S1230), the first UI image and the second UI image are displayed as the 3D images, similarly to the reproduction of the 3D content (S1240). If the user does not input a separate user command for receiving the 3D UI image in a state in which 2D content is reproduced, the image display device may display the first UI image and the second UI image as the 2D images (S1235).

If the first UI image and the second UI image are displayed as the 3D images, the user may control the senses of depth of the UI images. A signal which is input by the user in order to control the senses of depth of the UI images is hereinafter referred to as a sense-of-depth control signal. The user may input the sense-of-depth control signal so as to adjust the sense of depth of the first UI image and/or the second UI image (S1250).

If the sense-of-depth control signal of the user is input through the user input interface unit 140, the control unit 170 checks to which of the first UI image and the second UI image the sense-of-depth control signal is applied or the value of the sense of depth set by the user, processes the image signal again according to the depth value of the UI image, and outputs the processed image signal to the display unit 180. Accordingly, the first UI image and/or the second UI image are displayed on the display unit 180 according to the depth set by the user (S1260).

Figure 15:
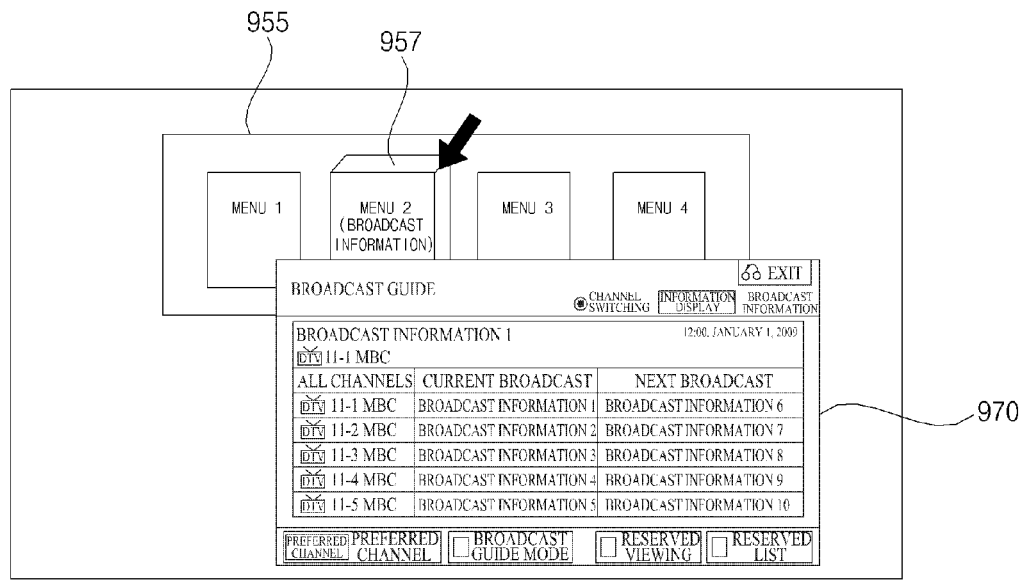
FIG. 15 is a diagram showing a screen for displaying a UI image and a 3D detailed image according to the embodiment of the present invention.

FIG. 15 is a diagram showing a screen for displaying a UI image and a 3D detailed image according to the embodiment of the present invention.

As shown in FIG. 15, a menu UI image 955 and a broadcast guide UI image 970 are displayed on the screen of the display unit 180 of the image display device. Here, the menu UI image 955 may be a 2D image. When a specific item 957 is selected from the menu UI image 955, the displayed broadcast guide UI image 970 is displayed as the 3D image. Here, the broadcast guide UI image 970 corresponds to the above-described detailed image. That is, only the detailed image corresponding to the item selected by the user is displayed as the 3D image. If the broadcast guide UI image 970, which is the detailed image, is displayed, the menu UI image 955 may not be displayed on the screen temporarily.

If an item selection signal is input before the detailed image is displayed, the selected item corresponding to the item selection signal may be displayed as the 3D image. Even when the UI image is a 2D image, the item selected by the user may be partially processed as the 3D image. That is, in the embodiment described with reference to FIG. 15, the user selects the item 957 for viewing broadcast information from the items of the menu UI image 955 as a first selection item and thus the broadcast guide UI image 970 is generated and displayed as the 3D image.

Figure 16:
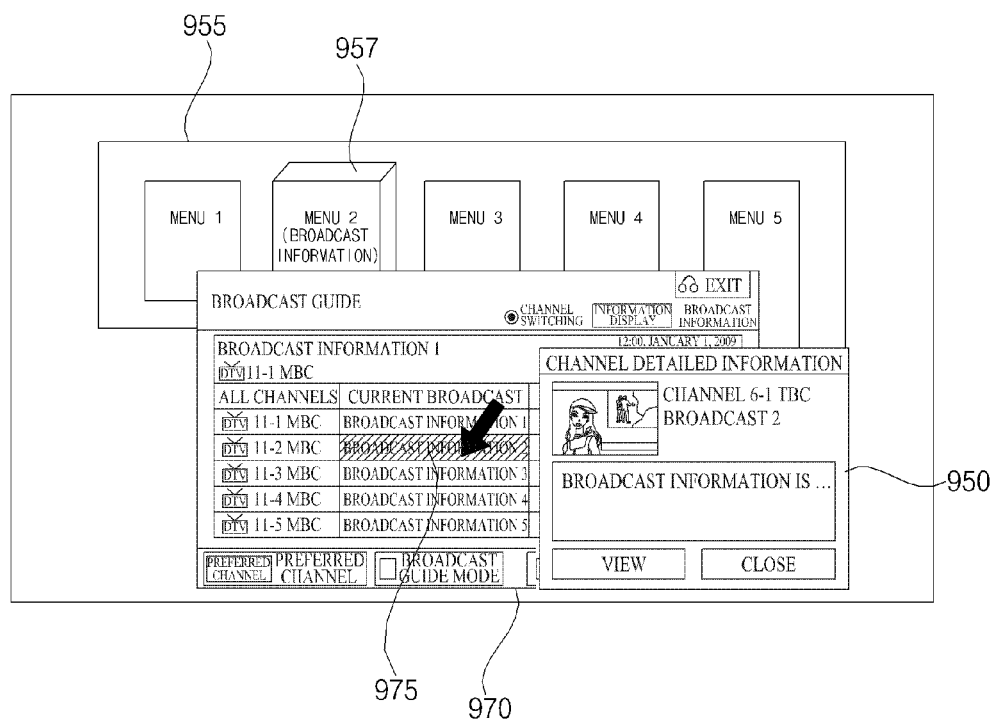
FIG. 16 is a diagram showing a screen for displaying UI images on multiple layers according to the embodiment of the present invention.

FIG. 16 is a diagram showing a screen for displaying UI images on multiple layers according to the embodiment of the present invention.

In the embodiment described with reference to FIG. 16, a menu UI image 955, a broadcast guide UI image 970 and a channel detailed information UI image 950 are displayed on the screen of the display unit 180 of the image display device.

An item 957 for viewing broadcast information is selected from the menu UI image 955 as a first selection item such that the broadcast guide UI image 970 is displayed, and a specific channel item 975 is selected from the broadcast guide UI image 970 as a second selection item such that the channel detailed information UI image 950 for the channel item is displayed.

Accordingly, the menu UI image 955 corresponds to the above-described high-level UI image, the broadcast guide UI image 970 corresponds to the first low-level UI image, and the channel detailed information UI image 950 corresponds to the second low-level UI image. The level of the first low-level UI image is relatively higher than that of the second low-level UI image.

Alternatively, the high-level UI image may be an EPG image or a channel list image, the low-level items may be channel items for channels included in the EPG image, and the low-level UI image may be the channel detailed information image indicating the detailed information of the channels.

In the embodiment shown in FIG. 16, unlike the embodiment shown in FIG. 15, the menu UI image 955 may be displayed as the 3D image. Since the levels of the menu UI image 955, the broadcast guide UI image 970 and the channel detailed information UI image 950 are different from each other, the depth values applied to the UI images are different from each other.

For example, the menu UI image which is the high-level UI image has a smallest depth value, the broadcast guide UI image 970 which is the first low-level UI image has a depth value larger than that of the menu UI image, and the channel detailed information UI image 950 which is the second low-level UI image the greatest depth value. In this case, the user can receive the 3D UI image displayed in multiple layers according to the level of the UI image, and a lowest-level UI image appears to be closest. The user may input a sense-of-depth control signal so as to change the senses of depth of the UI images later.

Figure 17:
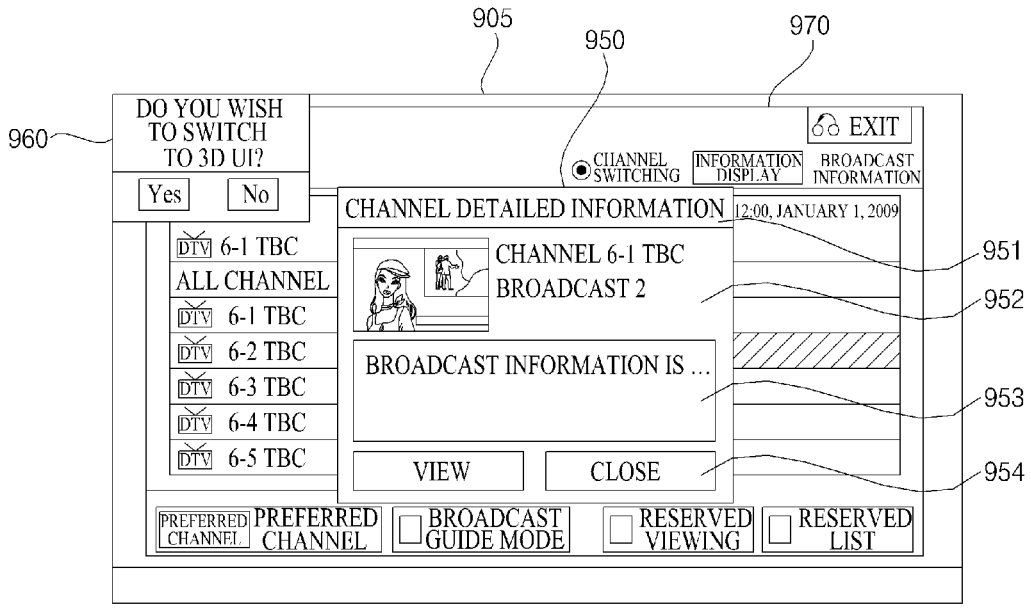
FIGS. 17 and 18 are diagrams showing a method for providing a UI image according to the embodiment of the present invention.
Figure 18:
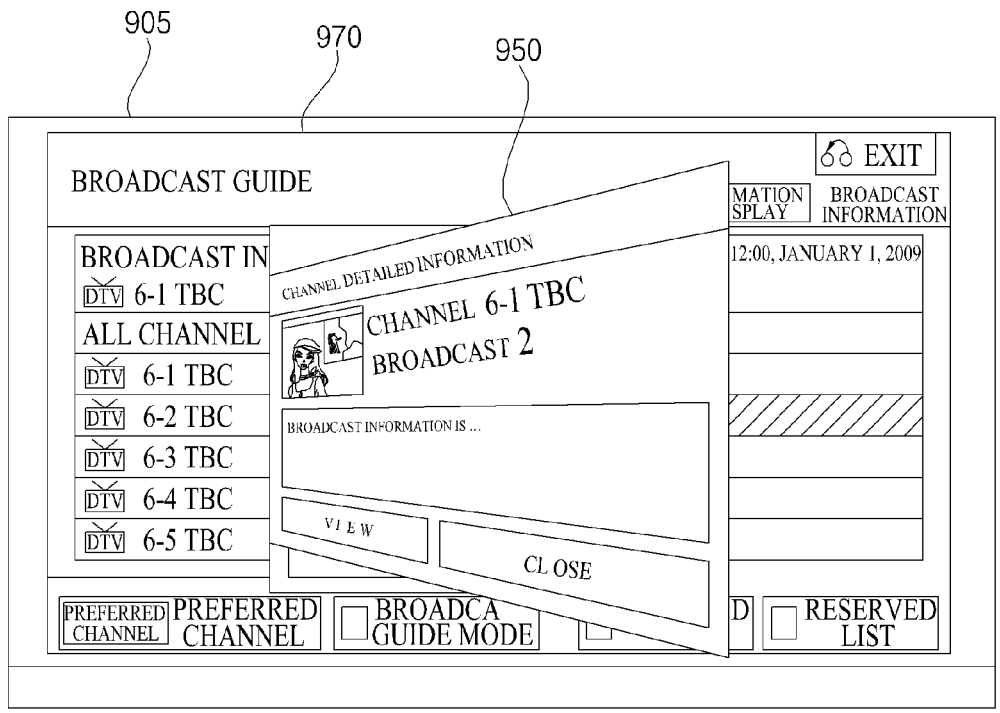

FIGS. 17 and 18 are diagrams showing a method for providing a UI image according to the embodiment of the present invention.

Referring to FIG. 17, the broadcast guide UI image 970 is output through the OSD on a first screen 910 for providing an image when content is reproduced, and the channel detailed information UI image 950 according to the selected item of the broadcast guide UI image 970 is shown together. That is, as shown in FIG. 17, the channel detailed information UI image 950 is displayed in addition to the broadcast guide UI image 970. The broadcast guide UI image 970 and the channel detailed information UI image 950 may be implemented as a menu and a sub menu or as 3D images having different senses of depth.

In FIG. 17, a specific channel item is selected from the broadcast guide UI image 970. That is, the channel item becomes the above-described selected item. The channel detailed information of the selected channel item is displayed on the display unit 180 through the channel detailed information UI image 950. At this time, the channel detailed information UI image 950 may include a first item 951 including information such as a title for identifying the UI image, a second item 952 including a broadcast screen of the channel, a preview screen, a channel number and broadcast station information, a third item 953 including detailed information about the channel and the broadcast of the channel, and a fourth item 954 including a supplementary menu.

According to the embodiment of the present invention, the broadcast guide UI image 970 may be displayed as a 2D image or the 3D image. Separately, the channel detailed information UI image 950 which is the detailed image of the item selected by the user is displayed as the 3D image. If both the broadcast guide UI image 970 and the channel detailed information UI image 950 are displayed as 3D images, the channel detailed information UI image 950 has a sense of depth different from that of the broadcast guide UI image.

The channel detailed information UI image 950 may be switched from the 3D image to the 2D image according to the selection of the user. A UI image (not shown) may be further displayed on the display unit 180 so as to enable the user to select the switching/non-switching to the 2D/3D image.

FIG. 18 is a diagram illustrating the case where a channel detailed information UI 950 is displayed as a 3D image and a tilt effect is applied. That is, the channel detailed information UI image 950 may have a sense of depth different from that of the broadcast guide UI image 900 or may be displayed as a 3D image having a different slope.

After the channel detailed information UI image 950 is displayed as a 3D image, a UI image configured to select the switching/non-switching of the channel detailed information UI image 950 to the 2D image may be further displayed. The UI image for selecting the switching/non-switching to the 2D image does not necessarily need to be displayed as a 3D image and may be displayed as a 2D image.

The UI image for selecting the switching/non-switching to the 2D/3D image does not need to be separately provided. According to another embodiment of the present invention, the UI image or the detailed image may be automatically switched to the 2D/3D image according to a predetermined configuration of the image display device. For example, if the channel detailed information UI image is requested in the broadcast guide UI image provided as the 2D image, the requested channel detailed information UI image may be displayed as a 3D image, and, if a specific item is selected from the channel detailed information UI such that another detailed image is displayed, the channel detailed information UI image may be automatically switched to the 2D image. In this case, provision/non-provision of a separate UI image for selecting the switching/non-switching to the 2D/3D image is not limited.

FIGS. 19 to 22 are diagrams showing a method for providing a UI image according to another embodiment of the present invention. The method for providing a video channel list UI image 1300 according to the embodiment of the present invention will be described with reference to FIGS. 19 to 22.

Figure 19:
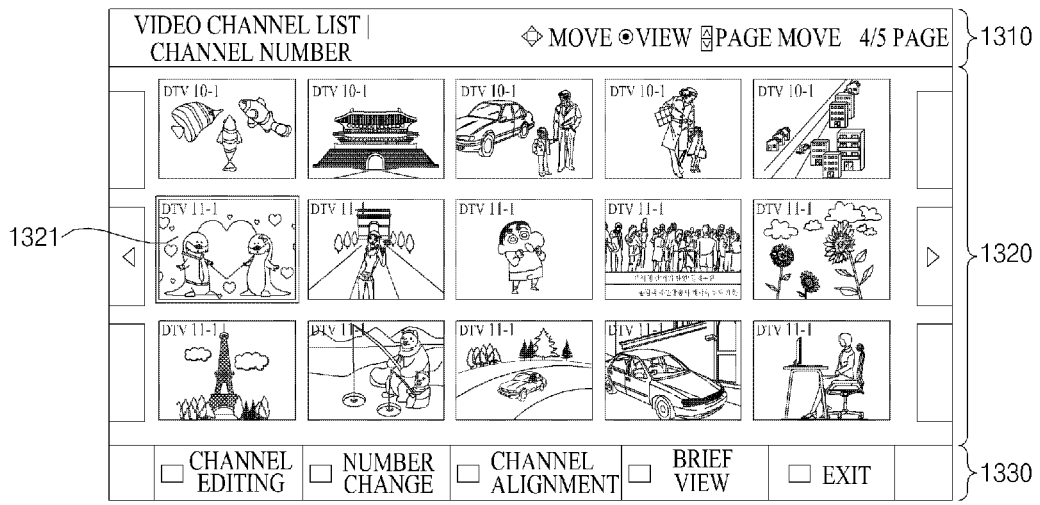
FIGS. 19 to 22 are diagrams showing a method for providing a UI image according to another embodiment of the present invention.

Referring to FIG. 19, the video channel list UI image 1300 includes a first region 1310 including information such as a title for identifying a UI, a second region 1320 including a plurality of channel list items, and a third region 1330 including a sub menu of the UI and a supplementary information item. The video channel list UI image 1300 is implemented as a 2D image.

In the first region 1310, the title item of the UI image is described. In the first region 1310, a supplementary information item associated with the UI image may be further included in addition to the title item. In the second region 1320, the plurality of video channel list items is output. Each video channel 1321 may include a channel number, current broadcast content of a broadcast station and a channel, or a preview screen, and the like.

In the third region 1330, items corresponding to various functions provided by the UI, for example, channel editing, change of the number of output video channel items, channel alignment, brief view and exit may be included.

Figure 20:
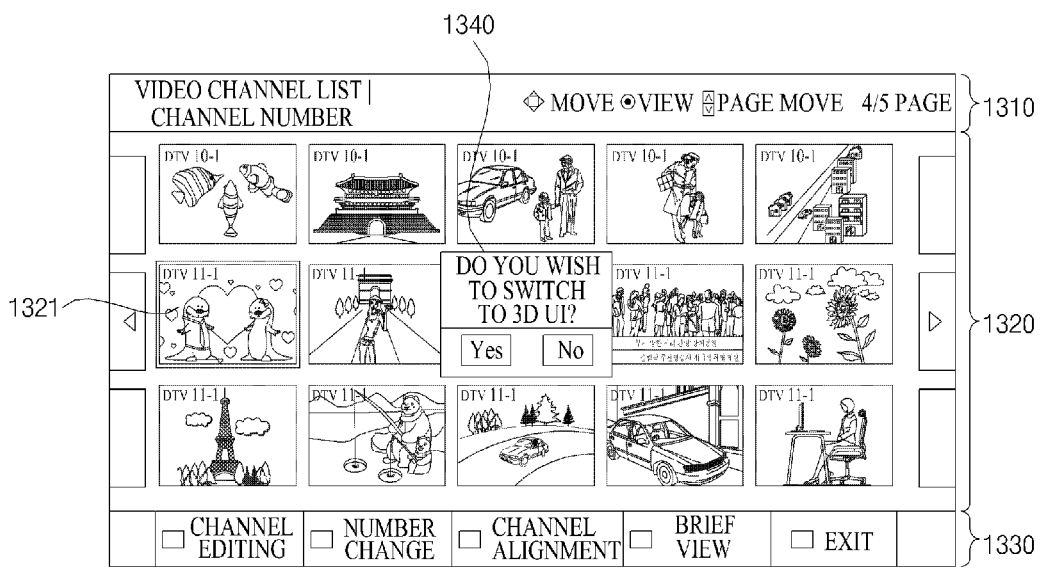

Referring to FIG. 20, a 2D/3D switching UI image 1340 which is a UI image configured to select whether or not a video channel item selectable (or selected) in the video channel list UI image 1300 is switched to a 3D image is further included, in addition to the video channel list UI image 1300 of FIG. 19. The 2D/3D switching UI image 1340 may be implemented as a 2D image or a 3D image.

Figure 21:
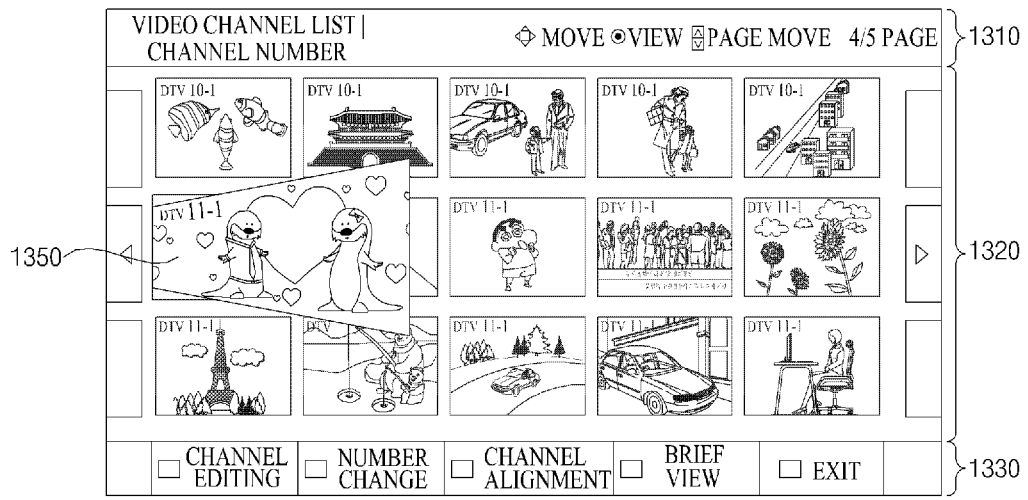

FIG. 21 shows an example in which one selected item 1350 of the video channel items is implemented as a 3D image when the switching to the 3D image is selected in the 2D/3D switching UI image 1340 of FIG. 20. As shown in FIG. 21, the selected item 1350 is displayed as a 3D image unlike the other video channel items displayed as 2D images.

Figure 22:
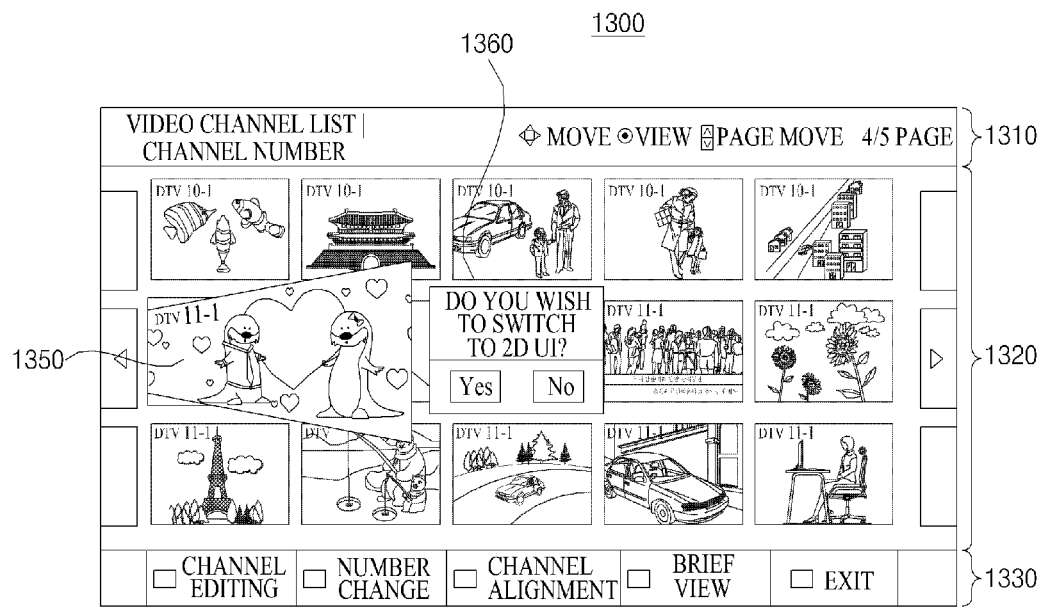

In FIG. 22, a 2D/3D switching UI image 1360 configured to select whether or not an item implemented as a 3D image in the video channel list UI image 1300 is switched to a 2D image is further included. The 2D/3D switching UI image 1360 may also be implemented as a 2D image or a 3D image. In addition, according to the embodiment of the present invention, the positions and the sizes of various UI images are not limited thereto. If the switching to the 2D image is selected through the 2D/3D switching UI image 1360 in FIG. 22, the video channel list UI image 1300 is displayed as a 2D image.

In FIGS. 19 to 22, when the video channel list UI image 1300 or each of the channel items 1320 included therein is switched to the 2D/3D image, a separate UI image configured to enable the user to select the switching/non-switching to the 2D/3D image is provided. However, the present invention is not limited thereto and a UI image configured to control the sense of depth of the UI image or item displayed as the 3D image may be displayed in addition to the UI image for 2D/3D switching.

In addition, although, in FIGS. 13 to 16, the example of providing the UI image as a 2D image and switching only the selected item or the detailed image thereof to a 3D image, the same principle is applicable to the case where the overall UI image is switched to a 3D image according to a switching request. In this case, an item selected from the UI image switched to the 3D image may be configured so as to be differentiated from the other items in view of a tilt degree or a depth degree.

FIGS. 23 to 26 are diagrams showing a method for providing a UI image according to another embodiment of the present invention.

Figure 23:
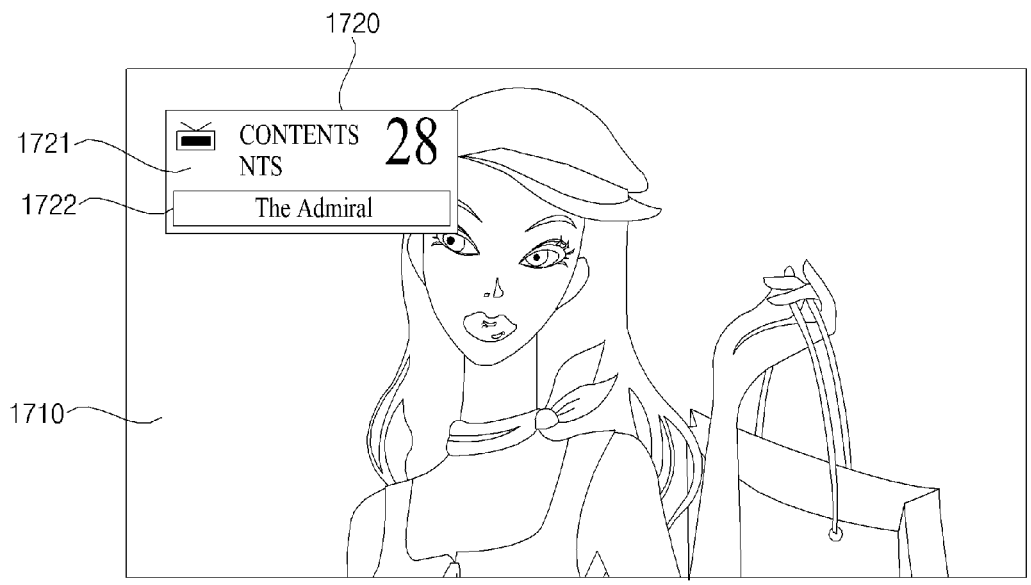
FIGS. 23 to 26 are diagrams showing a method for providing a UI image according to another embodiment of the present invention.

FIGS. 23 to 26 show the method for providing a channel banner UI image 1720 according to the embodiment of the present invention. In FIG. 23, the channel banner UI image 1720 is provided in a predetermined region of a screen 1710 output when content is reproduced.

In the channel banner 1720, a first item 1721 including a channel name and a channel number and a second item 1722 including the title of the content are included. The position and the size of the channel banner UI image 1720 and the information about each item are not limited thereto.

Figure 24:
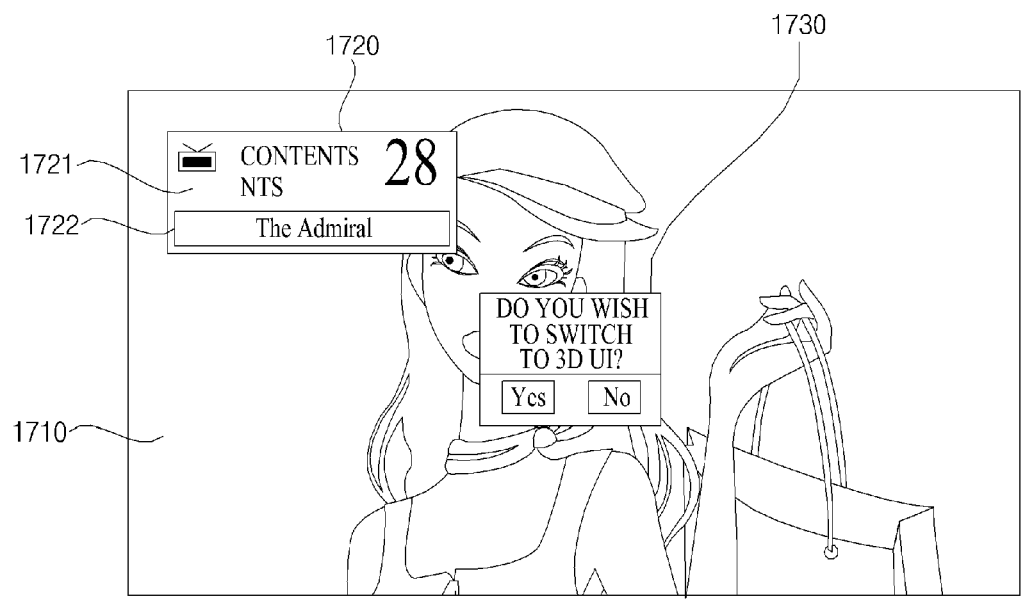

As shown in FIG. 24, a 2D/3D switching UI image 1730 configured to select the switching/non-switching of the channel banner UI image 1720 to a 2D/3D image is further displayed. Here, the 2D/3D switching UI image 1730 may be implemented as a 2D or 3D image.

Figure 25:
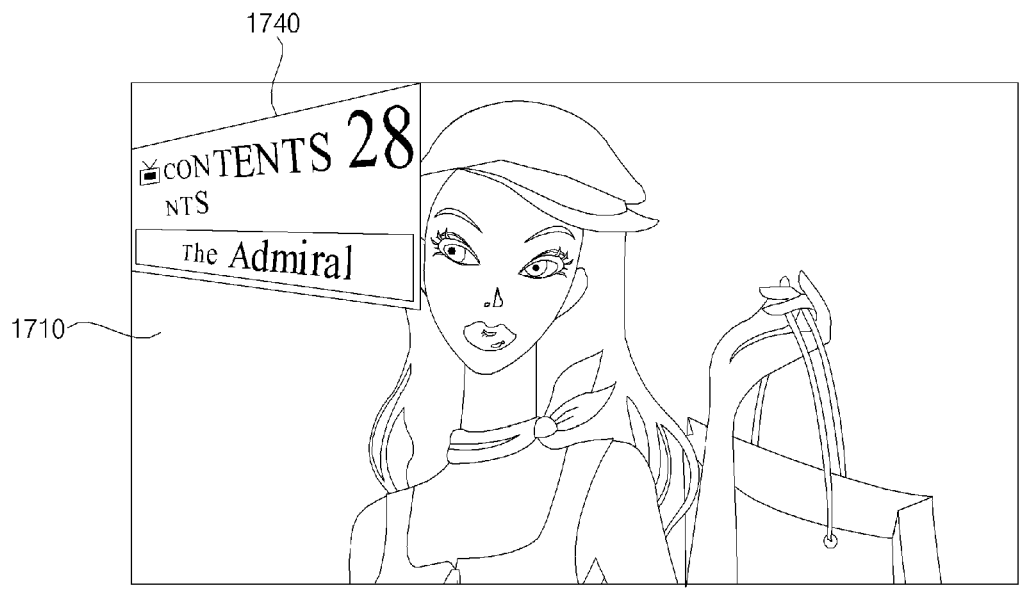

FIG. 25 shows the case where the channel banner UI image 1740 of FIG. 24 is displayed as a 3D image and a tilt and a sense of depth are applied. The sense of depth or the tilt effect of the channel banner UI image 1740 may be adjusted by enabling the user to input a sense-of-depth control signal or a tilt control signal. If a detailed image for providing supplementary information of a channel is derived from the channel banner UI image 1740, the detailed image may also be displayed with a sense of depth or a tilt different from that of the channel banner UI image 1740.

Figure 26:
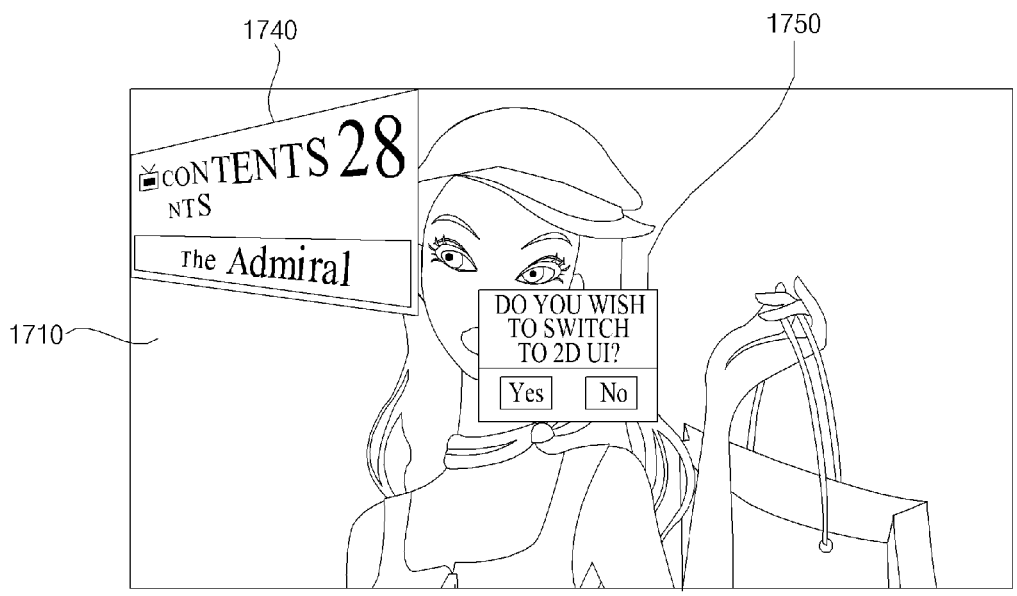

In FIG. 26, a UI 1750 configured to select the switching/non-switching to a 2D image is further displayed on the channel banner UI 1740 of FIG. 25. In the present invention, the positions and the sizes of the UIs provided in FIGS. 18 and 20 are not limited thereto.

If the switching to the 2D image is selected in FIG. 20, the channel banner UI has the same format as FIG. 23.

FIGS. 27 to 30 are diagrams showing a screen for providing a UI image according to content types according to another embodiment of the present invention. FIGS. 27 to 30 show embodiments in which an adequate UI image is provided according to the input content types. For example, if the input content is 2D content including a 2D image signal, a 2D UI image is provided and, if the input content is 3D content, a 3D UI image is provided. In this case, the image display device can display the content type to the user through the UI image so as to prevent confusion with regard to the content type. In addition, it is possible to enable the user to select an adequate viewing mode of the content so as to prevent inconvenience in viewing and to improve the user's awareness of the 3D content.

Figure 27:
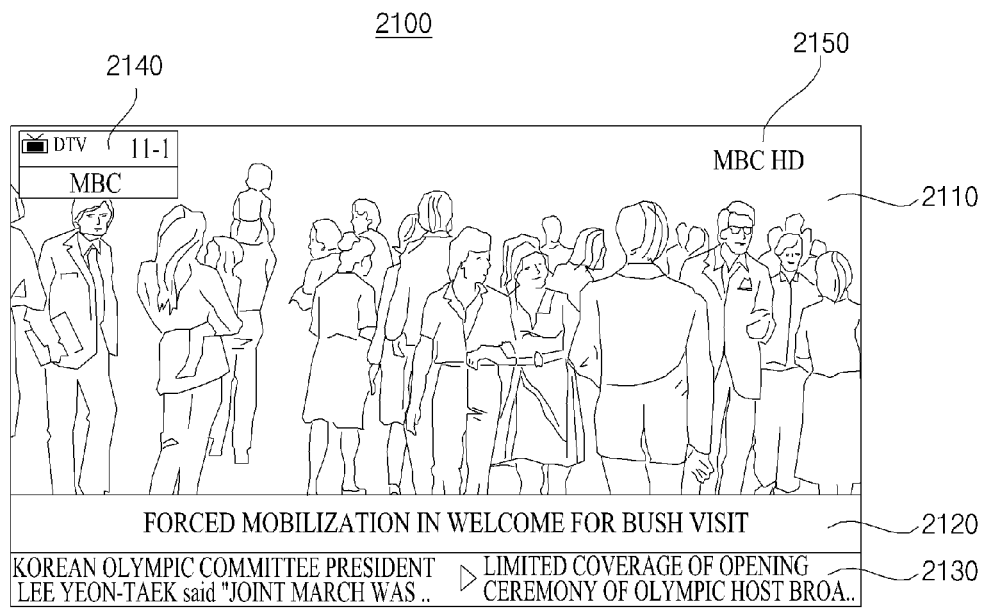
FIGS. 27 to 30 are diagrams showing a screen for providing a UI image according to content types according to another embodiment of the present invention.

In FIG. 27, a screen 2100 including a channel banner UI image 2140 and a content image is output. Hereinafter, it is assumed that the content is news, for convenience of description.

Referring to FIG. 27, the screen 2100 is divided into three regions. In a first region 2110, an image associated with news is output, the channel banner UI image 2140 is output in a portion of the first region, and a broadcast station or channel logo 2150 is output in the other portion of the first region. In a second region 2120, caption information of the image associated with the news output in the first region 2110 is output. In a third region 2130, a data broadcast service provided by the channel or the broadcast station is output. In FIG. 21, all the regions of the screen 2100 are implemented as 2D images.

Figure 28:
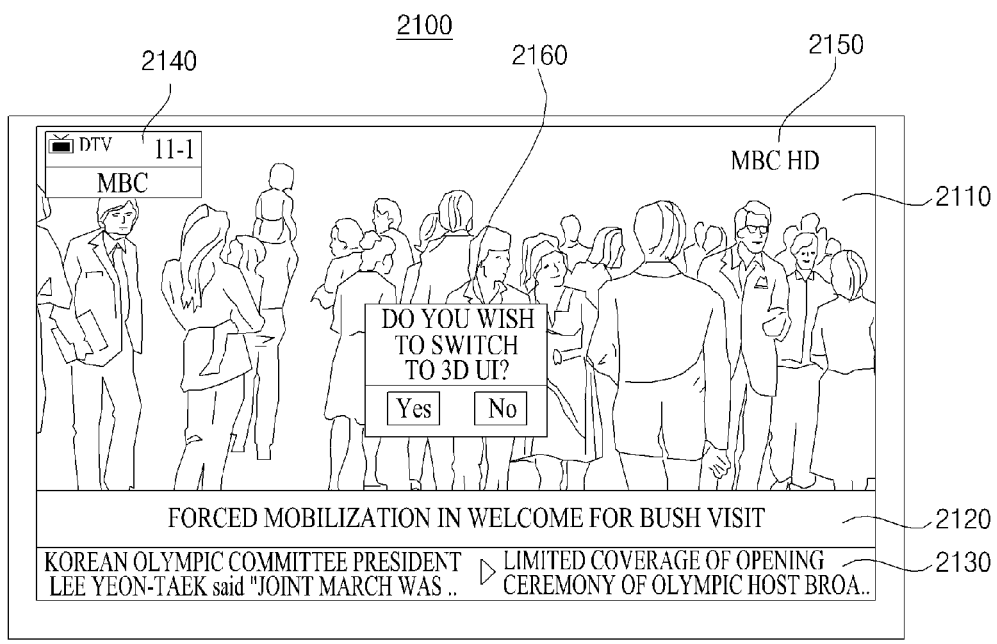

In FIG. 28, a 2D/3D switching UI image 2160 for selecting the switching/non-switching to the 3D image is included in a predetermined portion on the screen 2100 of FIG. 27. Here, the 2D/3D switching UI image 2160 may be implemented as a 2D or 3D image.

Figure 29:
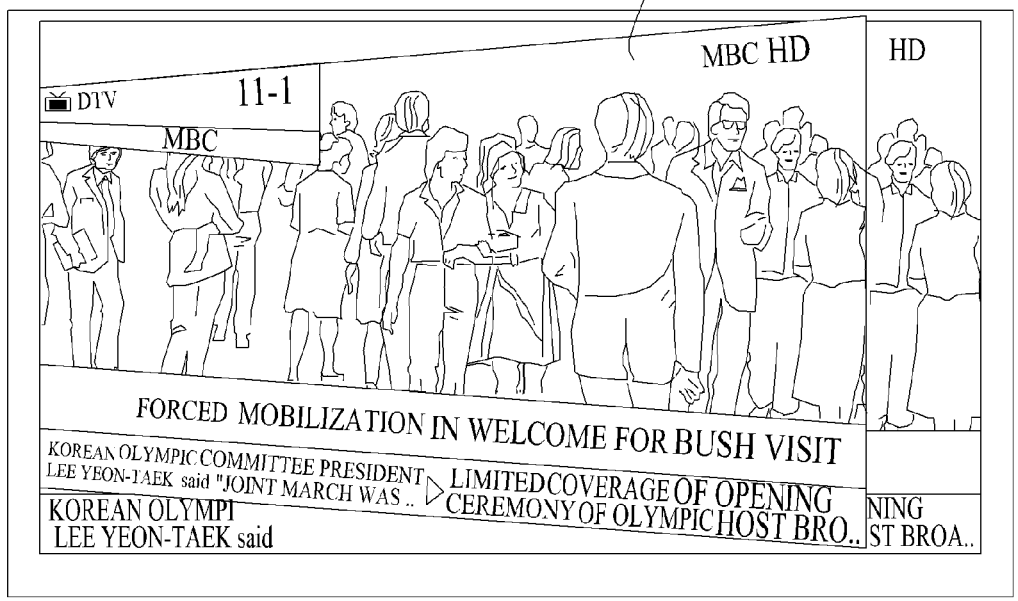

FIG. 29 shows a state in which the switching to the 3D image is selected in FIG. 28 and the overall screen 2170 including the channel banner UI image 2140 is implemented as the 3D image.

Figure 30:
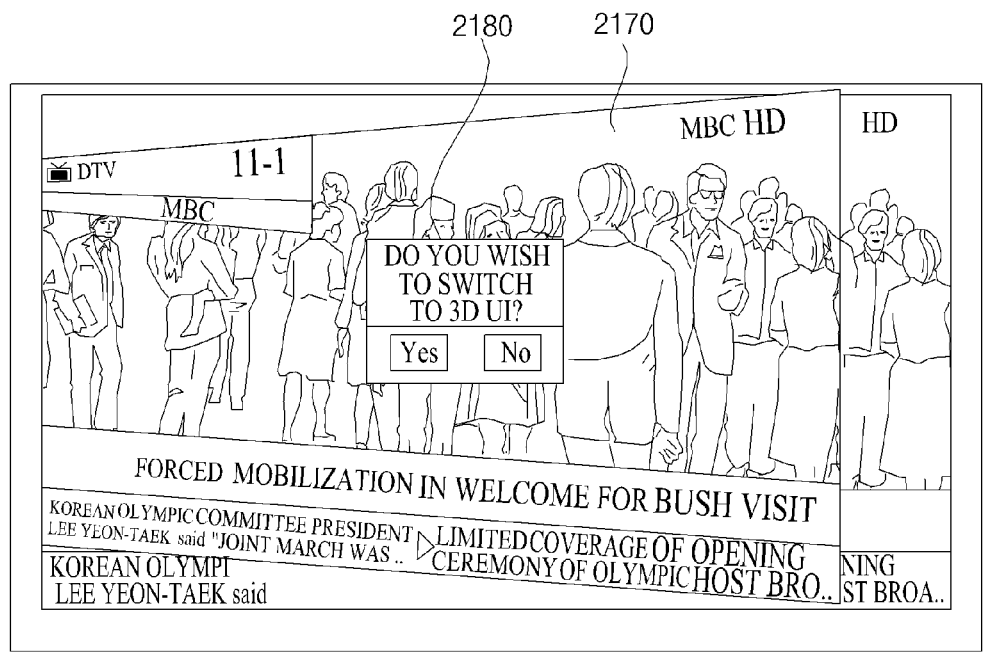

In FIG. 30, a 2D/3D switching UI image 2180 for selecting the switching/non-switching to the 2D image is included in a predetermined region on the screen 2170 of FIG. 29. Here, the 2D/3D switching UI image 2180 may be implemented as a 2D or 3D image.

If the switching to the 2D image is selected in FIG. 30, the screen 2170 implemented as the 3D image or some or all of the items included in the screen 2170 may be switched to the 2D image.

In the present invention, in switching to 2D/3D mode, the image or the UI image according to content reproduction may be switched by a receiver. However, in some content, the switching of the UI image to the 2D/3D image may be limited according to the content type. That is, if the content is a 2D image, although switching to a 3D image is selected, the image according to content reproduction may not be switched to the 3D image in the image display device. In this case, although a request to switch to the 3D mode is received from the user, only the UI image associated with the content may be output on the screen as a 3D image.

Accordingly, unlike FIGS. 23 to 26, in FIGS. 27 to 30, a UI for selecting the switching/non-switching to the 2D/3D image may be provided only when the content is a 3D image. A determination as to whether the content is 2D content or 3D content may be made in advance.

In FIGS. 27 to 30, the screen is switched to the 2D or 3D image according to the selection of the user in a separately provided UI image. However, the present invention is not limited thereto. A broadcast receiver may determine the content type, and provide a separate UI for selecting the switching/non-switching to the 3D image or automatically switch the content to the 3D image, if it is determined that the content type is a 3D image. In this case, the broadcast receiver should determine the type of the content input through an external input device or a broadcast signal.

In association with the present invention, an example of a method for determining the type of content will be described.

The image display device may determine the type of the content input, for example, using signaling information included in a broadcast signal. In the present specification, the signaling information is, for example, a PSI/PSIP table, as described above. That is, a transmitter defines and transmits type information of content transmitted through the broadcast signal in at least one table section of the PSI/PSIP table included in the broadcast signal, and a broadcast receiver decodes the table section and extracts type information so as to determine the type of the content.

Alternatively, the image display device may, for example, determine the type of the content using the type information included in an information frame configuring the content. That is, the image display device may extract the type information from the decoded information frame so as to determine the type of the content in advance.

As described above, if the content type information is not defined in the signaling information or the type information is not defined in the information frame of the content, the broadcast receiver cannot determine the type of the input content in advance. Accordingly, in this case, the control unit 170 of the image display device analyzes the image signal so as to determine the type of the content.

Hereinafter, the method for determining the type of the content by the receiver according to the present invention will be described.

In the present specification, a Euclidean distance (or Euclidean metric) for calculating a geometrical distance between two points m and m' in three-dimensional space is used.

$$\int \Sigma (m-m') = k < \epsilon \text{ } (\epsilon: \text{ a threshold value for determining a 3D image}) \quad \text{Equation 1}$$

Referring to Equation 1, the video processor 114 computes a sum k of a Euclidean distance of one point m of left-eye image data and one point m' of right-eye image data of a 3D format, compares the sum with a threshold value for determining whether or not the content is a 3D image, and determines whether the content is a 2D image or a 3D image.

The control unit 170 determines that the content is a 3D image if the value k of each block (a pixel unit in a checker board type format) of one frame is less than the value $\epsilon$ and determines that the content is a 2D image if the value K is greater than the value $\epsilon$.

In order to improve type determination accuracy, for example, two or more frames may be used. That is, the control unit 170 may obtain values k (k1 and k2) of the two or more frames using Equation 1, sum the obtained values k1 and k2, compare the sum with $\epsilon'$, and determine the type. Here, the value $\epsilon'$ indicates a threshold value defined when two or more frames are used.

Alternatively, two or more frames may be used, the type may be determined by comparison of the value k of each frame and the value $\epsilon$, and the type of the content may be estimated from the determination results of all the frames. In this case, it is determined that the content is a 3D image only when all the type determination results of the frames of the content are the 3D images.

In addition, a determination as to whether or not the content is a 3D image is not made by applying the above-described determination method to all the blocks or all the pixels of the frame unit, but may be made using only a predetermined number of blocks or pixels or arbitrarily selected blocks or pixels in each frame. In this case, if it is determined that the format of the content corresponds to any available 3D format, the type is determined with respect to all blocks or pixels of one or more frames so as to determine whether or not the same result is obtained. Accordingly, it is possible to improve the accuracy of the type determination result.

In addition, the control unit 170 determines the type using only one frame of each format and determines the type with respect to one or more of the residual frames with respect to the format if the format of the content corresponds to any one of 3D formats, thereby improving accuracy.

As described above, in the present invention, the video processor 114 determines whether the format of the content corresponds to a 3D format using Equation 1 in order to determine the type of the input content. For example, the control unit 170 determines the type with respect to an L/R format of the 3D format and determines the type with respect to a T/B format if it is determined that the content is not a 3D image. By this method, if it is determined that the content is not a 3D image with respect to the T/B format, the type is sequentially determined with respect to a checker board format, a frame sequential format and the like.

If it is determined that the format of the content does not correspond to a 3D format, the control unit 170 determines that the content is a 2D image. In contrast, if it is determined that the format of the content corresponds to any one of the 3D formats, it is determined that the content is a 3D image.

Figure 31:
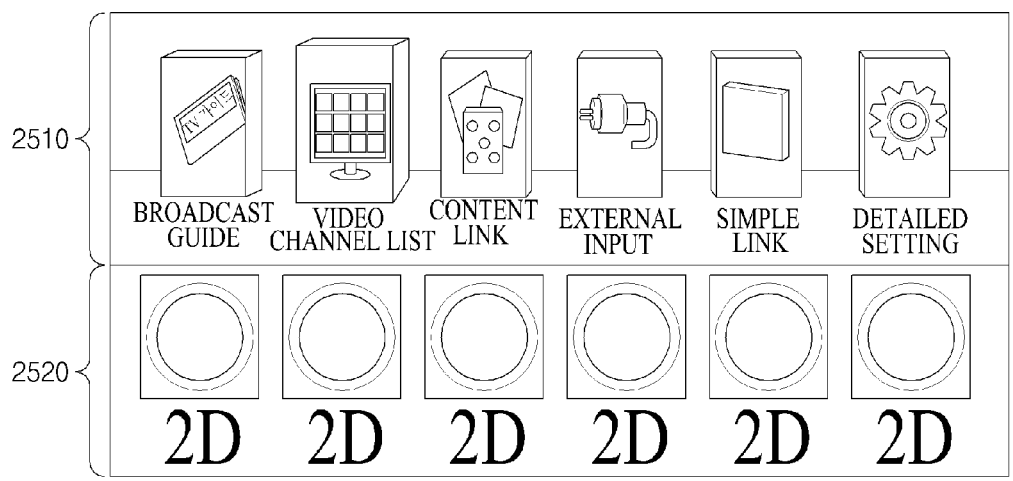
FIGS. 31 and 32 are diagrams showing a screen for providing a UI image for 2D/3D selection according to another embodiment of the present invention.
Figure 32:
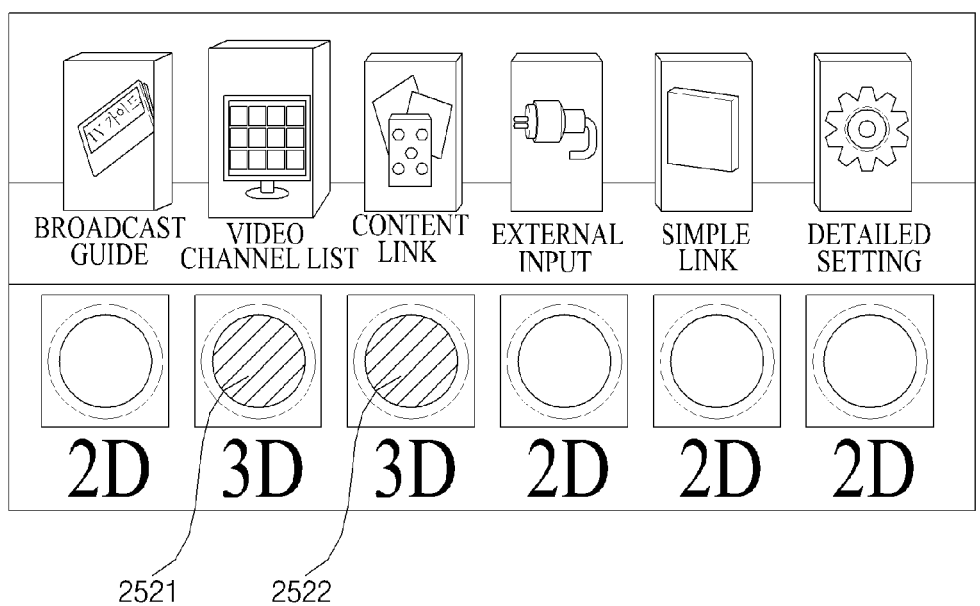

In FIGS. 31 and 32, a UI image for selecting a 2D/3D image is shown. The user may select whether various UI functions 2510 provided by the broadcast receiver are received as 2D images or 3D images through a UI image 2520 for selecting the 2D/3D image.

Referring to FIG. 31, icons indicating UI functions provided by the image display device, for example functions such as broadcast guide, a video channel list, a content link, an external input, a simple link, and detailed setting are arranged from the left to the right on the upper side of the UI image and, on the lower side thereof, separate UIs 2520 for selecting whether the UI functions are implemented as 2D images or 3D images are arranged at positions corresponding to the icons.

Referring to FIG. 32, among the UI functions of FIG. 31, UIs to be implemented as 3D images and UIs to be implemented as 2D images upon UI execution are displayed. That is, in the UI image 2520 for selecting the 2D/3D image, when the UIs for the video channel list and content link functions among the UI functions are requested by the user, the UI images for these UIs are implemented as 3D images. Separate 3D icons 2521 and 2522 are displayed with respect to the UI functions to be implemented as the 3D images.

The image display device and the method for operating the same according to the present invention are not limited to the configurations and the methods of the above-described embodiments, and some or all of the embodiments may be selectively combined such that the embodiments are variously modified.

The method for operating the image display device of the present invention may be implemented as code that can be written on a processor-readable recording medium and can thus be read by a processor included in the image display device. The processor-readable recording medium may be any type of recording device in which data can be stored in a processor-readable manner. Examples of the processor-readable recording medium include a ROM, a RAM, a CD-ROM, a magnetic tape, a floppy disc, an optical data storage, and a carrier wave (e.g., data transmission through the internet). The processor-readable recording medium can be distributed over a plurality of computer systems connected to a network so that computer-readable code is written thereto and executed therefrom in a decentralized manner.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for operating an image display device for displaying a 3-dimensional (3D) image, the method comprising:

displaying a high-level User Interface (UI) image including at least one low-level item;
receiving, from a remote controller, a user selection signal for selecting one of the at least one low-level item;
receiving a broadcast signal corresponding to the selected low-level item;
generating a low-level UI image corresponding to the selected low-level item; and
displaying the low-level UI image,
wherein the high-level UI image and the low-level UI image have different senses of depth,
wherein the selected low-level item is highlighted for discriminating between the selected low-level item and any other low-level items,
wherein a depth of the low-level UI image is greater than a depth of the high-level UI image,
wherein the low-level image includes an exit item indicating a termination of the display of the low-level image,
wherein the generating includes:
 extracting a thumbnail image corresponding to the broadcast signal; and
 generating and outputting an on-screen display (OSD) signal including the extracted thumbnail image; and
 converting the OSD signal into the 3D image, and
wherein the displayed low-level UI image further includes the thumbnail image, wherein:
 the high-level UI image and the low-level UI image include multiview images each including a left-eye image and a right-eye image;
 the senses of depth of the high-level UI image and the low-level UI image are respectively changed according to disparity between the left-eye image and the right-eye image for the high-level UI image and disparity between the left-eye image and the right-eye image for the low-level UI image; and
 the disparity between the left-eye image and the right-eye image for the low-level UI image is greater than the disparity between the left-eye image and the right-eye image for the high-level UI image.

2. The method according to claim 1,
further comprising:
receiving a sense-of-depth control signal for changing the sense of depth of at least one of the high-level UI image or the low-level UI image; and
adjusting the disparity of the high-level UI image or the low-level UI image according to the sense-of-depth control signal.

3. An image display device for displaying a 3-dimensional (3D) image, the image display device comprising:
a display unit configured to display a high-level User Interface (UI) image including at least one low-level item;
a user input unit configured to receive, from a remote controller, a user selection signal for selecting one of the at least one low-level item;
a broadcast signal reception unit configured to receive a broadcast signal corresponding to the selected low-level item; and
a control unit configured to generate a low-level UI image corresponding to the selected low-level item,
wherein the control unit generates the high-level UI image and the low-level UI image as 3D images having different senses of depth, and the display unit displays the high-level UI image and the low-level UI image together,
wherein the selected low-level item is highlighted for discriminating between the selected low-level item and any other low-level items,
wherein a depth of the low-level UI image is greater than a depth of the high-level UI image,
wherein the low-level image includes an exit item indicating a termination of the display of the low-level image,
wherein the control unit includes:
 an on-screen display (OSD) generator configured to extract a thumbnail image corresponding to the broadcast signal and to generate and output an OSD signal including the extracted thumbnail image; and
 a formatter configured to convert the OSD signal into the 3D image, and
wherein the displayed low-level UI image further includes the thumbnail image,
wherein:
 the high-level UI image and the low-level UI image include multiview images each including a left-eye image and a right-eye image,
 the control unit changes disparity between the left-eye image and the right-eye image for the high-level UI image and disparity between the left-eye image and the right-eye image for the low-level UI image according to the senses of depth set to the high-level UI image and the low-level UI image, and
 the control unit sets the disparity between the left-eye image and the right-eye image for the low-level UI image to be greater than the disparity between the left-eye image and the right-eye image for the high-level UI image.

4. The image display device according to claim 3,
wherein the user input unit is further configured to receive a sense-of-depth control signal for changing the sense of depth of at least one of the high-level UI image or the low-level UI image; and
the control unit is further configured to adjust the disparity of at least one of the high-level UI image or the low-level UI images according to the sense-of-depth control signal.

5. The method according to claim 1, further comprising:
receiving information from the remote controller; and
displaying a pointer based on the information received from the remote controller.

6. The method according to claim 1, wherein the high-level UI image includes a broadcast guide user interface image and the low-level UI image further includes title information, preview information, channel number information, or broadcast station information corresponding to the selected low-level item.

7. The image display device according to claim 3, wherein the high-level UI image includes a broadcast guide user interface image and the low-level UI image further includes title information, preview information, channel number information, or broadcast station information corresponding to the selected low-level item.

8. The image display device according to claim 3,
wherein the user input unit is further configured to receive information from the remote controller; and
wherein the display unit is further configured to display a pointer based on the information received from the remote controller.

* * * * *